(12) United States Patent
Shim et al.

(10) Patent No.: US 12,495,226 B2
(45) Date of Patent: Dec. 9, 2025

(54) IMAGE SENSOR COMPRISING PIXELS USABLE IN BOTH ROLLING SHUTTER AND GLOBAL SHUTTER MODE AND IMAGE PROCESSING DEVICE INCLUDING THE SAME

(71) Applicant: Samsung Electronics Co., Ltd., Suwon-si (KR)

(72) Inventors: Heesung Shim, Suwon-si (KR); Seungsik Kim, Suwon-si (KR); Jaekyu Lee, Suwon-si (KR); Seunghyun Lim, Suwon-si (KR); Sungjae Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/240,483

(22) Filed: Aug. 31, 2023

(65) Prior Publication Data

US 2024/0107195 A1    Mar. 28, 2024

(30) Foreign Application Priority Data

Sep. 23, 2022 (KR) .................. 10-2022-0121123
Jan. 13, 2023 (KR) .................. 10-2023-0005643

(51) Int. Cl.
*H04N 25/771* (2023.01)
*H04N 23/667* (2023.01)
(Continued)

(52) U.S. Cl.
CPC ......... *H04N 25/771* (2023.01); *H04N 23/667* (2023.01); *H04N 25/531* (2023.01); *H04N 25/532* (2023.01)

(58) Field of Classification Search
CPC .. H04N 23/667; H04N 25/531; H04N 25/532; H04N 25/59; H04N 25/771; H04N 25/778; H04N 25/79
See application file for complete search history.

(56) References Cited

U.S. PATENT DOCUMENTS 9,257,468 B2   2/2016   Gomi et al.
9,807,330 B2   10/2017   Aoki
(Continued)

FOREIGN PATENT DOCUMENTS

WO    2018218354 A1    12/2018

OTHER PUBLICATIONS

Extended European Search Report issued Jan. 29, 2024 for corresponding EP Patent Application No. 23198345.3.

*Primary Examiner* — Antoinette T Spinks
(74) *Attorney, Agent, or Firm* — Muir Patent Law, PLLC

(57) ABSTRACT

An image sensor comprising a pixel array in which a plurality of pixels are arranged and a row driver. Each of the pixel includes a photodiode, a transfer transistor for transferring photocharges of the photodiode to a floating diffusion node (FD), a conversion gain control transistor, a first source follower for amplifying and outputting the voltage of the FD to a first node, a precharge selection transistor connected between the first node and a second node, a first capacitor, a first sampling transistor connected between the second node and the first capacitor, a second capacitor, a second sampling transistor connected between the second node and the second capacitor, a second source follower for amplifying a voltage of the second node, a first selection transistor connected between the second source follower and a column line, and a second selection transistor connected between the first node and the column line.

20 Claims, 25 Drawing Sheets

(51) Int. Cl.
*H04N 25/531* (2023.01)
*H04N 25/532* (2023.01)

(56) References Cited

U.S. PATENT DOCUMENTS

| | | |
|---|---|---|
| 9,888,199 B2 | 2/2018 | Gomi et al. |
| 11,019,286 B2 | 5/2021 | Shim et al. |
| 11,375,145 B2 | 6/2022 | Otaka |
| 2013/0070133 A1 | 3/2013 | Takazawa |
| 2018/0227516 A1 | 8/2018 | Mo et al. |
| 2020/0195863 A1* | 6/2020 | Shim ............... H04N 25/77 |
| 2021/0218923 A1 | 7/2021 | Yoda |
| 2021/0235027 A1 | 7/2021 | Meynants |
| 2022/0094864 A1 | 3/2022 | Lee et al. |
| 2023/0007192 A1 | 1/2023 | Lee |

\* cited by examiner

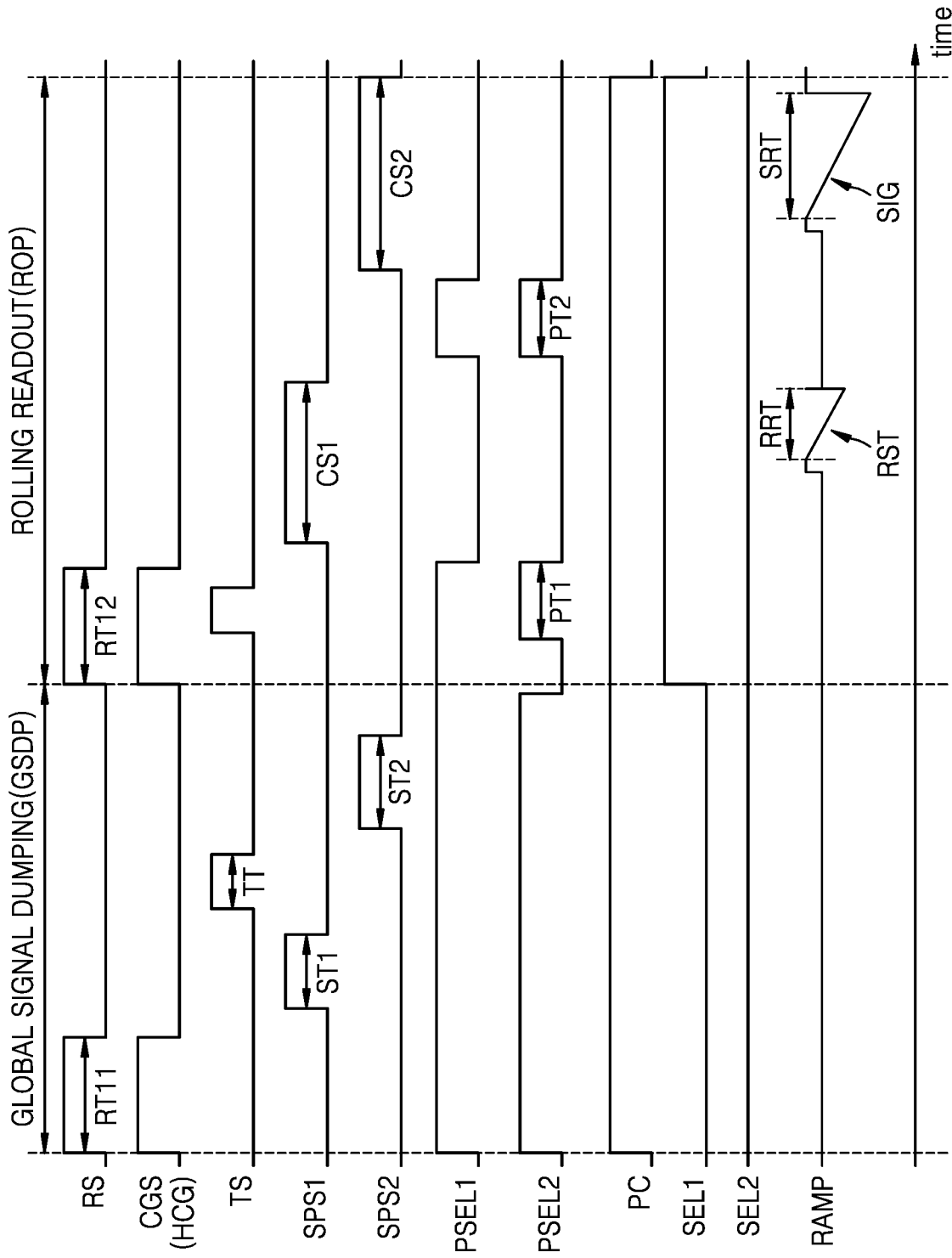

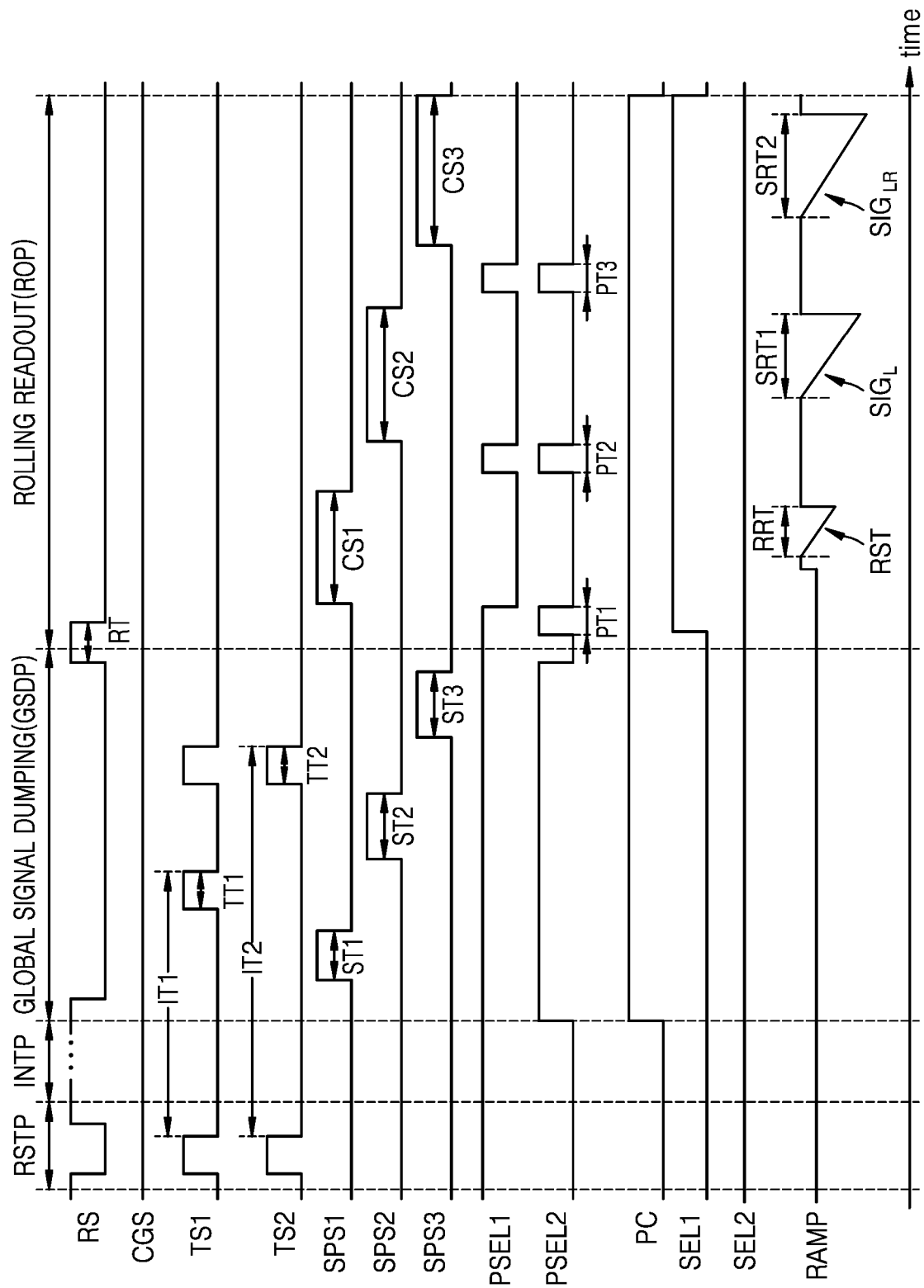

IMAGE SENSOR COMPRISING PIXELS USABLE IN BOTH ROLLING SHUTTER AND GLOBAL SHUTTER MODE AND IMAGE PROCESSING DEVICE INCLUDING THE SAME

CROSS-REFERENCE TO RELATED APPLICATIONS

This application is based on and claims priority under 35 U.S.C. § 119 to Korean Patent Application Nos. 10-2022-0121123, filed on Sep. 23, 2022, and 10-2023-0005643, filed on Jan. 13, 2023, in the Korean Intellectual Property Office, the disclosures of which are incorporated by reference herein in their entireties.

BACKGROUND

Aspects of the inventive concept relate to an image sensor, and more particularly, to an image sensor capable of supporting global shutter driving and rolling shutter driving.

Image sensors that capture an image and convert the captured image into an electrical signal are used in digital cameras, mobile phone cameras, and cameras to be mounted on general consumer electronic devices such as portable camcorders, automobiles, security devices, and robots.

An image sensor may determine the amount of photocharge, which is the basis of electrical signals, by controlling an exposure time. An image sensor may control an exposure time by using a global shutter method and a rolling shutter method. According to the global shutter method, a plurality of pixels of a pixel array have the same exposure start time and exposure period, and after the exposure period, a plurality of rows of the pixel array are sequentially read out. According to the rolling shutter method, a plurality of rows of a pixel array are sequentially exposed and sequentially read out.

SUMMARY

Aspects of the inventive concept provide an image sensor capable of supporting global shutter driving and rolling shutter driving and an image processing device including the same.

An image sensor according to an embodiment comprising a pixel array in which a plurality of pixels are arranged and a row driver configured to transmit control signals to the pixel array, wherein the plurality of pixels each include a first photodiode, a first transfer transistor configured to transfer photocharges generated by the first photodiode to a floating diffusion node, a conversion gain control transistor connected to the floating diffusion node and configured to adjust a rate at which the photocharges are converted into a voltage of the floating diffusion node, a first source follower configured to amplify the voltage of the floating diffusion node and output the amplified voltage to a first node, a precharge selection transistor having one end connected to the first node and another end connected to a second node, a first capacitor configured to sample a reset voltage corresponding to a voltage level of the floating diffusion node that is reset, a first sampling transistor having one end connected to the second node and another end connected to the first capacitor, a second capacitor configured to sample a first image voltage corresponding to the voltage level of the floating diffusion node according to the photocharges generated by the first photodiode, a second sampling transistor having one end connected to the second node and another end connected to the second capacitor, a second source follower configured to amplify a voltage of the second node and output the amplified voltage, a first selection transistor connected between an output terminal of the second source follower and a column line, and a second selection transistor connected between the first node and the column line.

An image sensor according to an embodiment includes a pixel array in which a plurality of pixels are arranged and a row driver configured to transmit control signals to the pixel array, wherein the plurality of pixels each include a plurality of sub-pixels each including a first photodiode and a second photodiode, a conversion gain control transistor connected to a floating diffusion node at which photocharges transferred from at least one of the plurality of sub-pixels are integrated, and configured to adjust a rate at which the photocharges are converted into a voltage of the floating diffusion node, a first source follower configured to amplify the voltage of the floating diffusion node and output the amplified voltage to a first node, a precharge selection transistor having one end connected to the first node and another end connected to a second node, a first sampling transistor having one end connected to the second node, a first capacitor having one end connected to another end of the first sampling transistor and another end to which a power supply voltage is applied, a second sampling transistor having one end connected to the second node, a second capacitor having one end connected to another end of the second sampling transistor and another end to which the power supply voltage is applied, a third sampling transistor having one end connected to the second node, a third capacitor having one end connected to another end of the third sampling transistor and another end to which the power supply voltage is applied, a second source follower configured to amplify a voltage of the second node and output the amplified voltage, a first selection transistor connected between an output terminal of the second source follower and a column line, and a second selection transistor connected between the first node and the column line.

An image processing device according to an embodiment includes an image sensor including a pixel array in which a plurality of pixels are arranged in a matrix form, the image sensor being configured to generate image data based on a light signal received by the pixel array, and an application processor configured to process the image data received from the image sensor and provide, to the image sensor, a mode setting signal for setting a first shutter mode or a second shutter mode, wherein the plurality of pixels each further include a plurality of sub-pixels each including a first photodiode and a second photodiode, a conversion gain control transistor connected to a floating diffusion node at which photocharges transferred from at least one of the plurality of sub-pixels are integrated, and configured to adjust a rate at which the photocharges are converted into a voltage of the floating diffusion node, a first source follower configured to amplify the voltage of the floating diffusion node and output the amplified voltage to a first node, a precharge selection transistor having one end connected to the first node and another end connected to a second node, a first sampling transistor having one end connected to the second node, a first capacitor having one end connected to another end of the first sampling transistor and another end to which a power supply voltage is applied, a second sampling transistor having one end connected to the second node, a second capacitor having one end connected to another end of the second sampling transistor and another end to which the power supply voltage is applied, a third sampling transistor having one end connected to the second node, a third capacitor having one end connected to another end of the third sampling transistor and another end to which the power supply voltage is applied, a second source follower configured to amplify a voltage of the second node and output the amplified voltage, a first selection transistor connected between an output terminal of the second source follower and a column line, and a second selection transistor connected between the first node and the column line.

BRIEF DESCRIPTION OF THE DRAWINGS

Embodiments will be more clearly understood from the following detailed description taken in conjunction with the accompanying drawings in which:

FIG. 5 is a timing diagram illustrating control signals and a ramp signal provided to a pixel, according to an embodiment;

FIGS. 9A and 9B are timing diagrams illustrating control signals and a ramp signal provided to a pixel, according to an embodiment;

DETAILED DESCRIPTION OF THE EMBODIMENTS

Hereinafter, embodiments will be described in detail with reference to the accompanying drawings.

Figure 1:
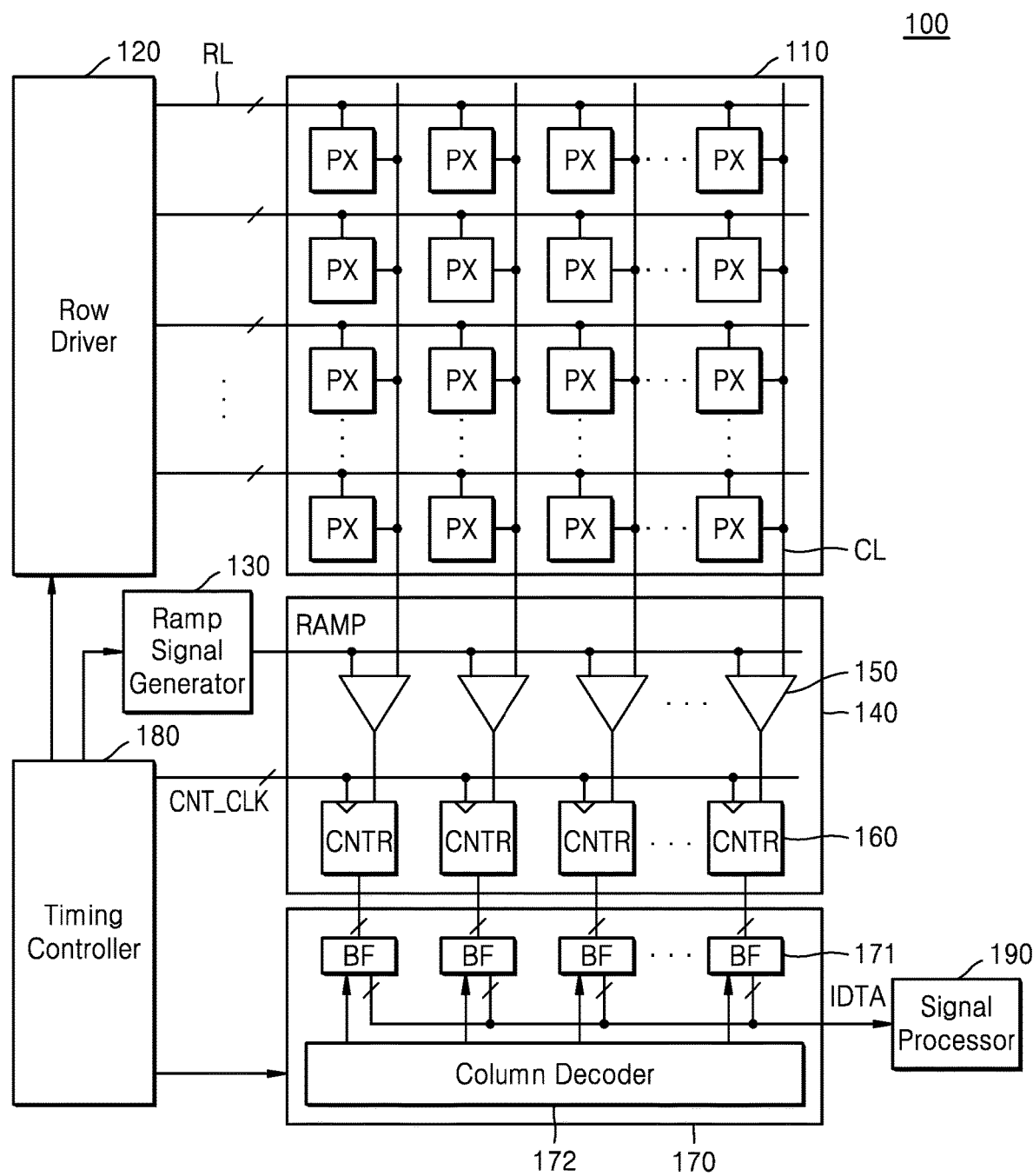
FIG. 1 is a block diagram illustrating an image sensor according to an embodiment.

FIG. 1 is a block diagram illustrating an image sensor 100 according to an embodiment.

The image sensor 100 may be mounted on an electronic device having an image or light sensing function. For example, the image sensor 100 may be mounted on an electronic device, such as a camera, a smartphone, a wearable device, an Internet of things (IoT) device, a home appliance, a tablet personal computer (PC), a personal digital assistant (PDA), a portable multimedia player (PMP), a navigation system, a drone, or an advanced drivers assistance system (ADAS). In addition, the image sensor 100 may be mounted on an electronic device provided as a component in, for example, a vehicle, furniture, a manufacturing facility, a door, and various measuring devices.

Referring to FIG. 1, the image sensor 100 may include a pixel array 110, a row driver 120, a ramp signal generator 130, an analog-to-digital conversion (ADC) circuit 140, a data output circuit 170, and a timing controller 180. The image sensor 100 may further include a signal processor 190. A configuration including the ramp signal generator 130, the ADC circuit 140, and the data output circuit 170 may be referred to as a readout circuit.

The pixel array 110 may include a plurality of row lines RL, a plurality of column lines CL, and a plurality of pixels PX connected to the row lines RL and the column lines CL and arranged in a matrix form. The pixels PX may each be an active pixel sensor (APS).

The pixels PX may each include at least one photoelectric conversion element. The pixels PX may each sense light by using the photoelectric conversion element and output an image signal that is an electrical signal based on the sensed light. For example, the photoelectric conversion element may include a photodiode, a phototransistor, a photogate, or a pinned photodiode.

The pixels PX may each sense light of a specific spectral region. For example, the pixels PX may include a red pixel that converts light of a red spectral region into an electrical signal, a green pixel that converts light of a green spectral region into an electrical signal, and a blue pixel that converts light of a blue spectral region into an electrical signal. In an embodiment, the pixels PX may have a Bayer pattern color arrangement. However, aspects of the inventive concept are not limited thereto, and the pixels PX may further include a white pixel. As another example, the pixels PX may include pixels combined in different color configurations, for example, a yellow pixel, a cyan pixel, and a magenta pixel.

A color filter array that transmits light of a specific spectral region may be disposed above the pixels PX. Colors capable of being sensed by the pixel may be determined according to color filters disposed above the pixels. However, aspects of the inventive concept are not limited thereto. In some embodiments, a specific photoelectric conversion element may convert light of a specific wavelength band into an electrical signal according to a level of an electrical signal applied to the photoelectric conversion element.

In an embodiment, the pixels PX may each have a pixel structure capable of operating in accordance with a global shutter method and a rolling shutter method. The pixel array 110 may operate in accordance with a global shutter method or a rolling shutter method. According to the global shutter method, the pixels PX of the pixel array 110 have the same exposure start time and exposure period, and after the exposure period, the rows of the pixel array 110 are sequentially read out. According to the rolling shutter method, the rows of the pixel array 110 are sequentially exposed and sequentially read out.

In an embodiment, the pixels PX may each have a dual conversion gain. The dual conversion gain may include a low conversion gain and a high conversion gain. The conversion gain may refer to a rate at which charges integrated at a floating diffusion node (see FD of FIG. 3) are converted into a voltage. Charges generated by the photoelectric conversion element may be transferred to and integrated at the floating diffusion node FD, and the charges integrated at the floating diffusion node FD may be converted into a voltage according to a conversion gain. In this case, the conversion gain may vary according to the capacitance of the floating diffusion node FD. When the capacitance increases, the conversion gain may decrease, and when the capacitance decreases, the conversion gain may increase.

In an embodiment, the pixels PX may each include at least two photodiodes. The image sensor 100 may provide an autofocus (AF) function based on pixel signals corresponding to photocharges output from the at least two photodiodes.

A pixel structure of the pixels PX according to aspects of the inventive concept are described in detail with reference to FIGS. 3, 7, 10, 11, and 14.

The row driver 120 may drive the pixel array 110 in units of rows. The row driver 120 may decode a row control signal (e.g., an address signal) received from the timing controller 180 and may select at least one of the row lines RL constituting the pixel array 110 in response to the decoded row control signal. For example, the row driver 120 may generate a selection signal for selecting one of the rows. The pixel array 110 may output a pixel signal (e.g., a pixel voltage) from the row selected by the selection signal provided from the row driver 120. The pixel signal may include a reset signal and an image signal. The row driver 120 may transmit, to the pixel array 110, control signals for outputting the pixel signal, and the pixel PX may operate to output the pixel signal in response to the control signals.

The ramp signal generator 130 may generate a ramp signal (e.g., a ramp voltage), the level of which rises or falls with a certain slope under the control of the timing controller 180. The ramp signal RAMP may be provided to each of a plurality of correlated double sampling (CDS) circuits 150 included in the ADC circuit 140.

The ADC circuit 140 may include the CDS circuits 150 and a plurality of counters 160. The ADC circuit 140 may convert pixel signals (e.g., pixel voltages) input from the pixel array 110 into pixel values that are digital signals. The CDS circuits 150 and the counters 160 may convert pixel signals received through the column lines CL into pixel values that are digital signals.

The CDS circuit 150 may compare the pixel signal (e.g., the pixel voltage) received through the column line CL with the ramp signal RAMP and may output a comparison result as a comparison signal. When the level of the ramp signal RAMP is equal to the level of the pixel signal, the CDS circuit 150 may output the comparison signal that transitions from a first level (e.g., logic high) to a second level (e.g., logic low). A time point at which the level of the comparison signal transitions may be determined according to the level of the pixel signal. Hereinafter, for convenience of explanation, the first level is referred to as a high level and the second level is referred to as a low level.

The CDS circuit 150 may sample the pixel signal provided from the pixel PX in accordance with a CDS method. The CDS circuit 150 may generate the comparison signal according to the reset signal by sampling the reset signal received as the pixel signal and comparing the reset signal with the ramp signal RAMP. Thereafter, the CDS circuit 150 may generate the comparison signal according to the image signal by sampling the image signal correlated with the reset signal and comparing the image signal with the ramp signal RAMP.

The counter 160 may output a count value by counting a level transition time point of the comparison signal output from the CDS circuit 150, based on a counting clock CNT_CLK provided from the timing controller 180.

In some embodiments, the counter 160 may be implemented as an up-counter and a calculation circuit in which the count value sequentially increases based on the counting clock CNT_CLK. Alternatively, the counter 160 may be implemented as an up/down counter or a bit-wise inversion counter.

In some embodiments, the image sensor 100 may further include a counting code generator that generates a counting code (e.g., a gray code), the value of which changes periodically, and provides the counting code to the counters 160. The counter 160 may include a latch circuit and a calculation circuit. The latch circuit may latch a code value of a counting code at a time point at which a level of the comparison signal transitions. The latch circuit may latch a code value (e.g., a reset value) corresponding to the reset signal and a code value (e.g., an image signal value) corresponding to the image signal. The calculation circuit may generate the image signal value, from which the reset level of the pixel PX is removed, by calculating the reset value and the image signal value. The counter 160 may output the image signal value, from which the reset level is removed, as the pixel value.

The data output circuit 170 may temporarily store the pixel value output from the ADC circuit 140 and then output the pixel value. The data output circuit 170 may include a plurality of column memories 171 (also referred to as buffers BF) and a column decoder 172. The column memories 171 may store the pixel values received from the corresponding counters 160. In some embodiments, the column memories 171 may be respectively included in the counters 160. The pixel values stored in the column memories 171 may be output as image data IDTA under the control of the column decoder 172.

The timing controller 180 may output the control signals to the row driver 120, the ramp signal generator 130, the ADC circuit 140, and the data output circuit 170 and may control the operations or timings of the row driver 120, the ramp signal generator 130, the ADC circuit 140, and the data output circuit 170.

The signal processor 190 may perform noise reduction processing, gain control, waveform shaping processing, interpolation processing, white balance processing, gamma processing, edge enhancement processing, binning, and the like on the image data IDTA. In some embodiments, the signal processor 190 may be provided in an external processor (not shown) located outside the image sensor 100.

Figure 2A:
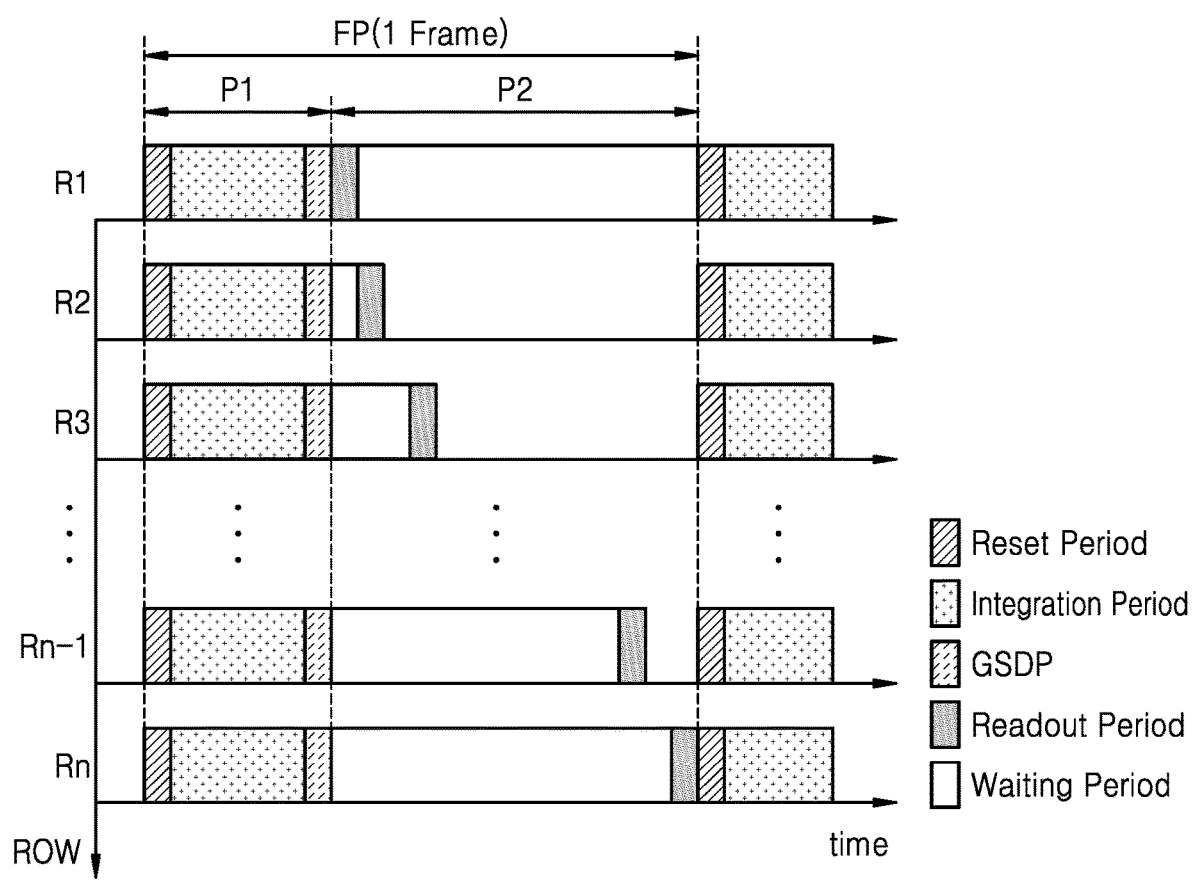
FIGS. 2A and 2B are timing diagrams illustrating an operation of a global shutter mode and an operation of a rolling shutter mode.
Figure 2B:
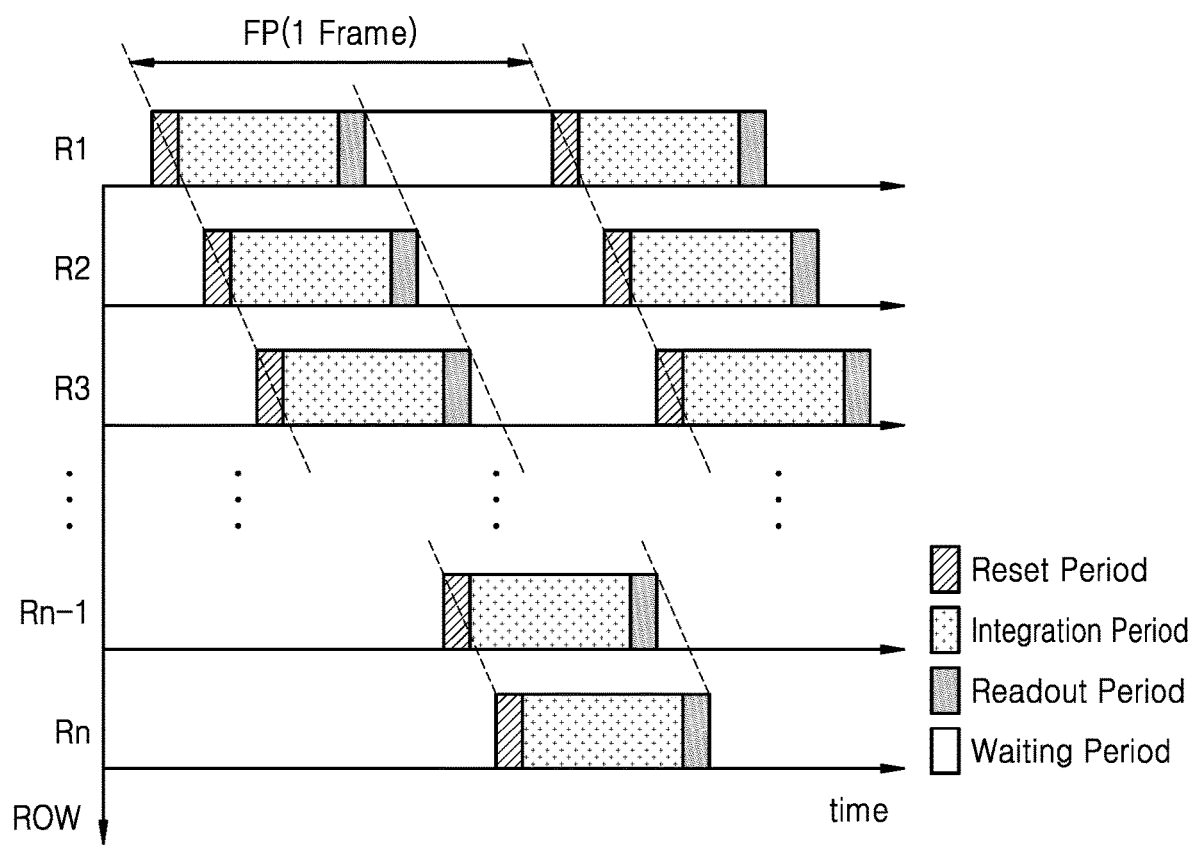

FIGS. 2A and 2B are timing diagrams illustrating an operation of a global shutter mode and an operation of a rolling shutter mode.

Referring to FIGS. 1 and 2A, the image sensor 100 may operate in the global shutter mode.

One frame period FP may include a first period P1 and a second period P2. In the first period P1, the pixels PX of the pixel array 110, that is, the rows (e.g., first to $n^{th}$ rows R1 to Rn) of the pixel array 110 may simultaneously perform a reset operation, an exposure operation, and a global signal dumping operation. In the second period P2, the rows of the pixel array 110 may sequentially perform a readout operation. The second period P2 may be referred to as a frame readout period.

The first period P1 may include a reset period, an integration (i.e., exposure) period, and a global signal dumping period GSDP. In the reset period, the pixels PX may perform a reset operation of removing charges integrated at the photodiode (and the floating diffusion node). In the integration period, the pixels PX may perform an integration operation in which the photodiode generates and integrates photocharges corresponding to the received light signal. In the global signal dumping period GSDP, the pixels PX may store the reset signal according to the reset level of the floating diffusion node and the image signal corresponding to the photocharges integrated at the photodiode in at least two capacitors provided therein.

In the second period P2, a rolling readout operation in which the readout operation performed during the readout period is sequentially performed for each row may be performed. For example, after the readout operation is performed on the first row R1 of the pixel array 110, the readout operation may be performed on the second row R2 subsequent to the first row R1. After the readout operation is performed on the second row R2, the readout operation may be performed on the third row R3 subsequent to the second row R2. Accordingly, after the readout operation is performed on the first row R1, a waiting period, between the first period P1 and the readout period of subsequent rows (i.e., R2-Rn) may incrementally increase. In the readout operation, the reset signal and the image signal respectively stored in at least two capacitors during the global signal dumping period GSDP may be output from each pixel PX as the pixel signal.

Referring to FIGS. 1 and 2B, the image sensor 100 may operate in the rolling shutter mode.

In one frame period FP, the rows (e.g., the first to $n^{th}$ rows R1 to Rn) of the pixel array 110 may sequentially perform the reset operation, the exposure operation, and the readout operation.

In the reset period, the pixels PX of one row of the pixel array 110 may perform the reset operation. In the integration period, the pixels of one row of the pixel array 110 may perform the integration operation. In the readout period, the pixels PX of one row of the pixel array 110 may output, as the pixel signal, the reset signal (e.g., the reset voltage) corresponding to the reset level of the floating diffusion node and the image signal (e.g., the image voltage) corresponding to the photocharges generated by the photodiode. The readout periods of the rows of the pixel array 110 do not overlap each other. After the readout period, the pixels PX of one row of the pixel array 110 may perform the reset operation again after a waiting period. In an embodiment, the waiting period may be set so that the readout period in the subsequent frame period of at least one row (e.g., the first row R1, the second row R2, etc.) initially read out during the frame period FP does not overlap the readout period in the current frame period of at least one other row (e.g., the $(n-1)^{th}$ row Rn−1, the $n^{th}$ row Rn, etc.) read out at the end of the frame period FP.

As described above, the image sensor 100 according to aspects of the inventive concept may selectively operate in the global shutter mode or the rolling shutter mode. In an embodiment, an electronic device (e.g., an image processing device) on which the image sensor 100 is mounted may operate in the global shutter mode during high-speed moving image capture, and may operate in the rolling shutter mode during high-quality still image capture or low-speed moving image capture (i.e., during high-quality image generation). In an embodiment, the image sensor 100 may operate in the rolling shutter mode in a high illuminance environment and may operate in the global shutter mode in a low illuminance environment.

Figure 3:
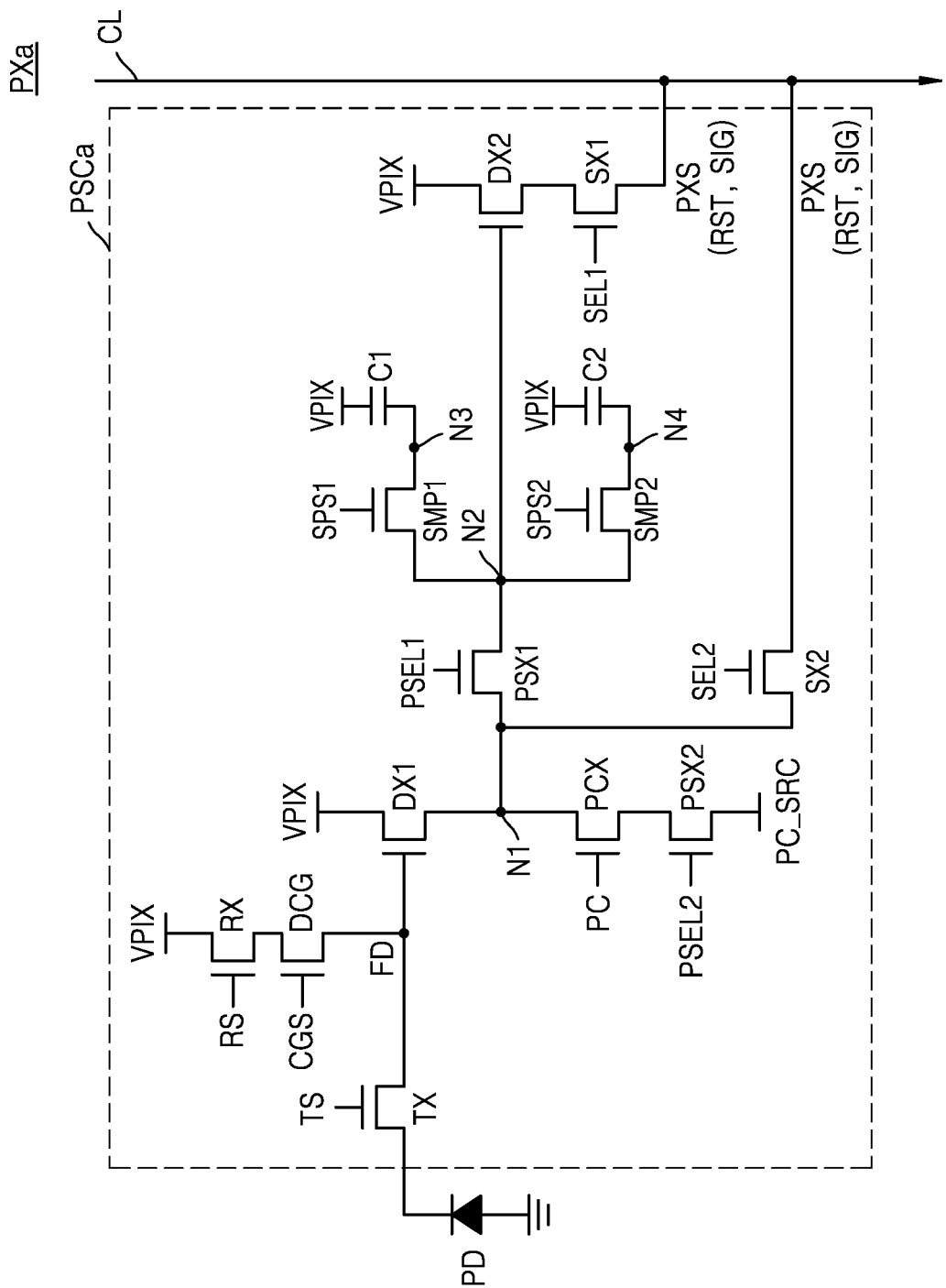
FIG. 3 is a circuit diagram illustrating a pixel according to an embodiment.

FIG. 3 is a circuit diagram illustrating a pixel PXa according to an embodiment.

Referring to FIG. 3, the pixel PXa may include a photodiode PD and a pixel signal generation circuit PSCa (also referred to as a pixel circuit). The pixel signal generation circuit PSCa may include a plurality of transistors, a first capacitor C1, and a second capacitor C2. The transistors may include a transfer transistor TX, a reset transistor RX, a conversion gain control transistor DCG, a first driving transistor DX1, a first precharge selection transistor PSX1, a second precharge selection transistor PSX2, a precharge transistor PCX, a first sampling transistor SMP1, a second sampling transistor SMP2, a second driving transistor DX2, a first selection transistor SX1, and a second selection transistor SX2. Control signals may be applied to the pixel signal generation circuit PSCa. The control signals may include a transfer control signal TS, a reset control signal RS, a gain control signal CGS, a first precharge selection control signal PSEL1, a second precharge selection control signal PSEL2, a precharge signal PC, a first sampling control signal SPS1, a second sampling control signal SPS2, a first selection signal SEL1, and a second selection signal SEL2. At least some of the control signals may be generated by the row driver 120.

The photodiode PD may generate photocharges that vary according to the intensity of light. For example, the photodiode PD may generate charges, that is, electrons with negative charges and holes with positive charges, in proportion to the amount of incident light.

The transfer transistor TX may be connected between the photodiode PD and a floating diffusion node FD. A first terminal of the transfer transistor TX may be connected to an output terminal of the photodiode PD, and a second terminal of the transfer transistor TX may be connected to the floating diffusion node FD. The transfer transistor TX may be turned on or off in response to the transfer control signal TS received from the row driver 120. The transfer transistor TX may be turned on so that photocharges generated by the photodiode PD are transferred to the floating diffusion node FD.

The reset transistor RX may reset charges integrated at the floating diffusion node FD. A pixel voltage VPIX may be applied to a first terminal of the reset transistor RX, and a second terminal of the reset transistor RX may be connected to a first terminal of the conversion gain control transistor DCG. The reset transistor RX may be turned on or off in response to the reset control signal RS received from the row driver 120. When the reset transistor RX and the conversion gain control transistor DCG are turned on, charges integrated at the floating diffusion node FD may be discharged to reset the floating diffusion node FD.

The conversion gain control transistor DCG may control the conversion gain of the pixel PXa. The conversion gain may refer to a rate at which charges integrated at the floating diffusion node FD are converted into a voltage. The conversion gain may vary according to the capacitance of the floating diffusion node FD. When the capacitance increases, the conversion gain may decrease, and when the capacitance decreases, the conversion gain may increase.

The conversion gain control transistor DCG may be turned on or off in response to the gain control signal CGS. When the conversion gain control transistor DCG is turned on, the capacitance of the floating diffusion node FD may increase, and thus, the conversion gain may decrease. When the conversion gain control transistor DCG is turned off, the capacitance of the floating diffusion node FD may decrease, and thus, the conversion gain may increase. Accordingly, the pixel PXa may operate in a high conversion gain (HCG) mode or a low conversion gain (LCG) mode according to the on/off state of the conversion gain control transistor DCG. For example, the pixel PXa may operate in a dual conversion gain mode. The conversion gain mode may be determined by the on/off state of the conversion gain control transistor DCG.

The pixel voltage VPIX may be applied to a first terminal of the first driving transistor DX1, and a second terminal of the first driving transistor DX1 may be connected to a first node N1. The first driving transistor DX1 may be referred to herein as a "first source follower." The first driving transistor DX1 may operate as a buffer amplifier that buffers a signal according to the amount of charges charged at the floating diffusion node FD. The potential of the floating diffusion node FD may change according to the amount of charges integrated at the floating diffusion node FD, and the first driving transistor DX1 may amplify the potential change (i.e., voltage) in the floating diffusion node FD and output the amplified potential change to the first node N1. The first driving transistor DX1 may output a voltage corresponding to the voltage of the floating diffusion node FD to the first node N1.

The pixel signal generation circuit PSCa may operate the first driving transistor DX1 and include a plurality of transistors that precharge a second node N2, for example, the precharge transistor PCX, the first precharge selection transistor PSX1, and the second precharge selection transistor PSX2.

A first terminal of the precharge transistor PCX may be connected to the first node N1, and a second terminal of the precharge transistor PCX may be connected to a first terminal of the second precharge selection transistor PSX2. A second terminal of the second precharge selection transistor PSX2 may be connected to a precharge source PC_SRC. For example, the precharge source PC_SRC may be a ground voltage. The second precharge selection transistor PSX2 may be turned on or off in response to the second precharge selection control signal PSEL2. The second precharge selection transistor PSX2 may be turned on so that the precharge source PC_SRC is provided to the second terminal of the precharge transistor PCX. The precharge transistor PCX may operate as a current source and may generate a load current according to the precharge signal PC. The first driving transistor DX1 may operate according to the load current.

A first terminal of the first precharge selection transistor PSX1 may be connected to the first node N1, and a second terminal of the first precharge selection transistor PSX1 may be connected to the second node N2. The first precharge selection transistor PSX1 may be turned on or off in response to the first precharge selection control signal PSEL1. The second precharge selection transistor PSX1 may be turned on so that the second node N2 is precharged.

Although FIG. 3 illustrates that the pixel PXa includes the two precharge selection transistors PSX1 and PSX2, aspects of the inventive concept are not limited thereto. The pixel PXa may include various numbers of precharge selection transistors that precharge the second node N2 based on the voltage of the first node N1.

The first sampling transistor SMP1, the second sampling transistor SMP2, the first capacitor C1, and the second capacitor C2 may operate as a sampling circuit that samples a first voltage (e.g., a reset voltage) and a second voltage (e.g., an image voltage) output through the first node N1 when the pixel PXa operates in the global shutter mode.

A first terminal of the first sampling transistor SMP1 may be connected to the second node N2, and a second terminal of the first sampling transistor SMP1 may be connected to a third node N3. A first terminal of the first capacitor C1 may be connected to the third node N3, and the pixel voltage VPIX may be applied to a second terminal of the first capacitor C1. In an embodiment, the ground voltage may be applied to the second terminal of the first capacitor C1. The first sampling transistor SMP1 may be turned on or off in response to the first sampling control signal SPS1. The first sampling transistor SMP1 may be turned on so that the first capacitor C1 is connected to the second node N2. A first terminal of the second sampling transistor SMP2 may be connected to the second node N2, and a second terminal of the second sampling transistor SMP2 may be connected to a fourth node N4. A first terminal of the second capacitor C2 may be connected to the fourth node N4, and the pixel voltage VPIX may be applied to a second terminal of the second capacitor C2. In an embodiment, the ground voltage may be applied to the second terminal of the second capacitor C2. The second sampling transistor SMP2 may be turned on or off in response to the second sampling control signal SPS2. The second sampling transistor SMP2 may be turned on so that the second capacitor C2 is connected to the second node N2.

The first capacitor C1 and the second capacitor C2 may sample the reset voltage according to the reset operation or may sample the image voltage according to photocharges integrated at the photodiode PD.

In the global signal dumping period (see GSDP of FIG. 2), the first precharge selection transistor PSX1 and the second precharge selection transistor PSX2 may be in an on state. In this case, while the first sampling transistor SMP1 is in an on state, charges may be integrated at the first capacitor C1 and a reset voltage RST may be sampled (stored) in the first capacitor C1. Thereafter, while the second sampling transistor SMP1 is in an on state, charges may be integrated at the second capacitor C2 and an image voltage SIG may be sampled (stored) in the second capacitor C2.

The pixel voltage VPIX may be applied to a first terminal of the second driving transistor DX2, and a second terminal of the second driving transistor DX2 may be connected to the first selection transistor SX1. The second driving transistor DX2 may be referred to herein as a "second source follower." The second driving transistor DX2 may amplify a potential change (i.e., voltage) in the second node N2 and output the amplified potential change.

A first terminal of the first selection transistor SX1 may be connected to the second driving transistor DX2, and a second terminal of the first selection transistor SX1 may be connected to the column line CL. The first selection transistor SX1 may be turned on or off in response to the first selection signal SEL1.

When the pixel PXa operates in the global shutter mode, the first selection transistor SX1 may be turned on during the readout period of the pixel PXa, so that the output of the second driving transistor DX2, for example, the reset voltage RST or the image voltage SIG, is output to the column line CL as the pixel signal PXS.

For example, the reset voltage RST sampled in the first capacitor C1 may be output as the pixel signal PXS when the first selection transistor SX1 is in an on state, the first sampling transistor SMP1 is in an on state, and the second sampling transistor SMP2 is in an off state. The image voltage SIG stored in the second capacitor C2 may be output as the pixel signal PXS when the second selection transistor SX2 is in an on state, the second sampling transistor SMP2 is in an on state, and the first sampling transistor SMP1 is in an off state.

A first terminal of the second selection transistor SX2 may be connected to the first node N1, and a second terminal of the second selection transistor SX2 may be connected to the column line CL. The second selection transistor SX2 may be turned on or off in response to the second selection signal SEL2.

When the pixel PXa operates in the rolling shutter mode, the second selection transistor SX2 may be turned on during the readout period of the pixel PXa, so that the output of the first driving transistor DX1, for example, the reset voltage RST or the image voltage SIG, is output to the column line CL as the pixel signal PXS.

Figure 4A:
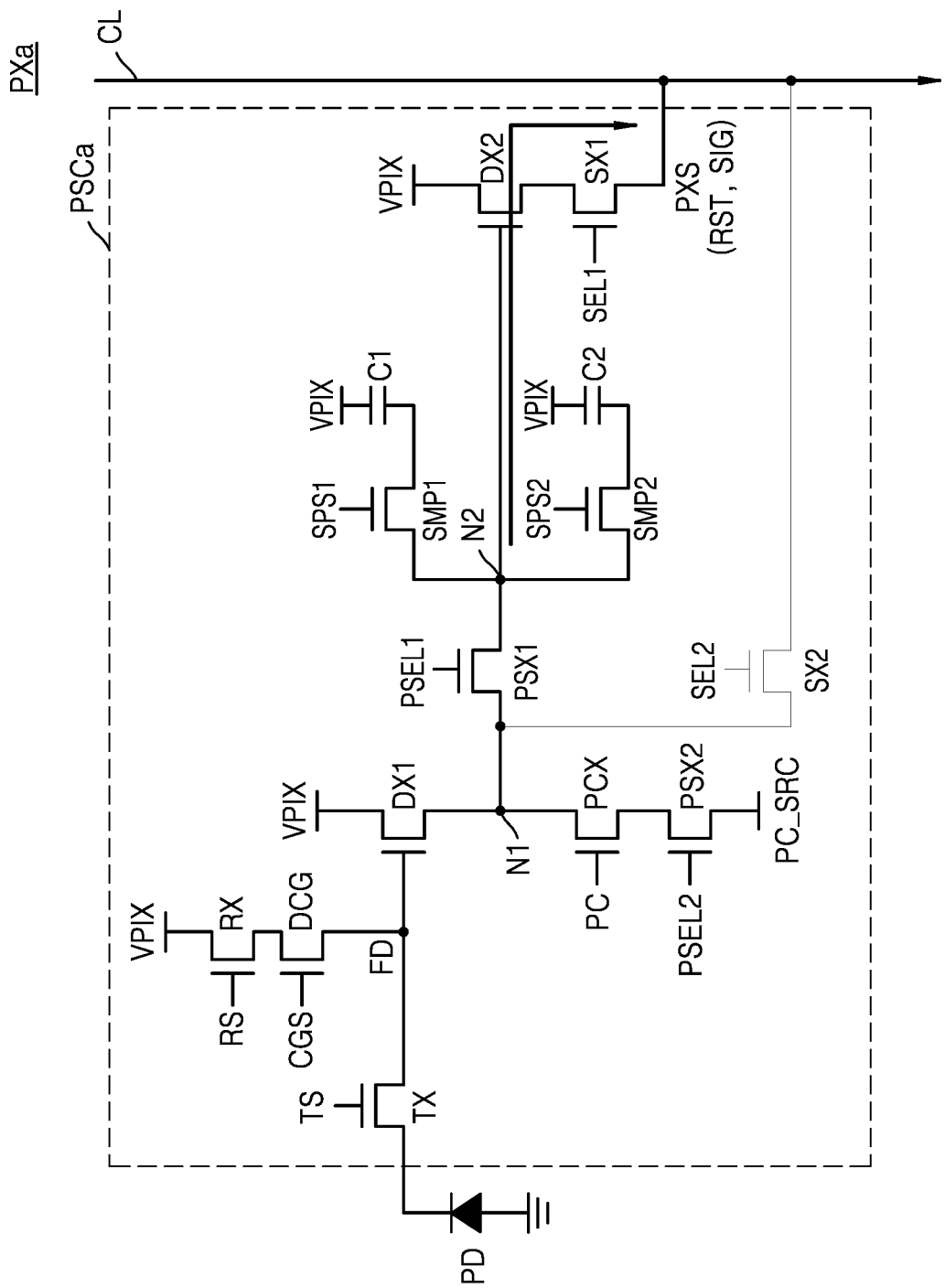
FIGS. 4A and 4B illustrate readout operations of a pixel in a global shutter mode and a rolling shutter mode, according to an embodiment.
Figure 4B:
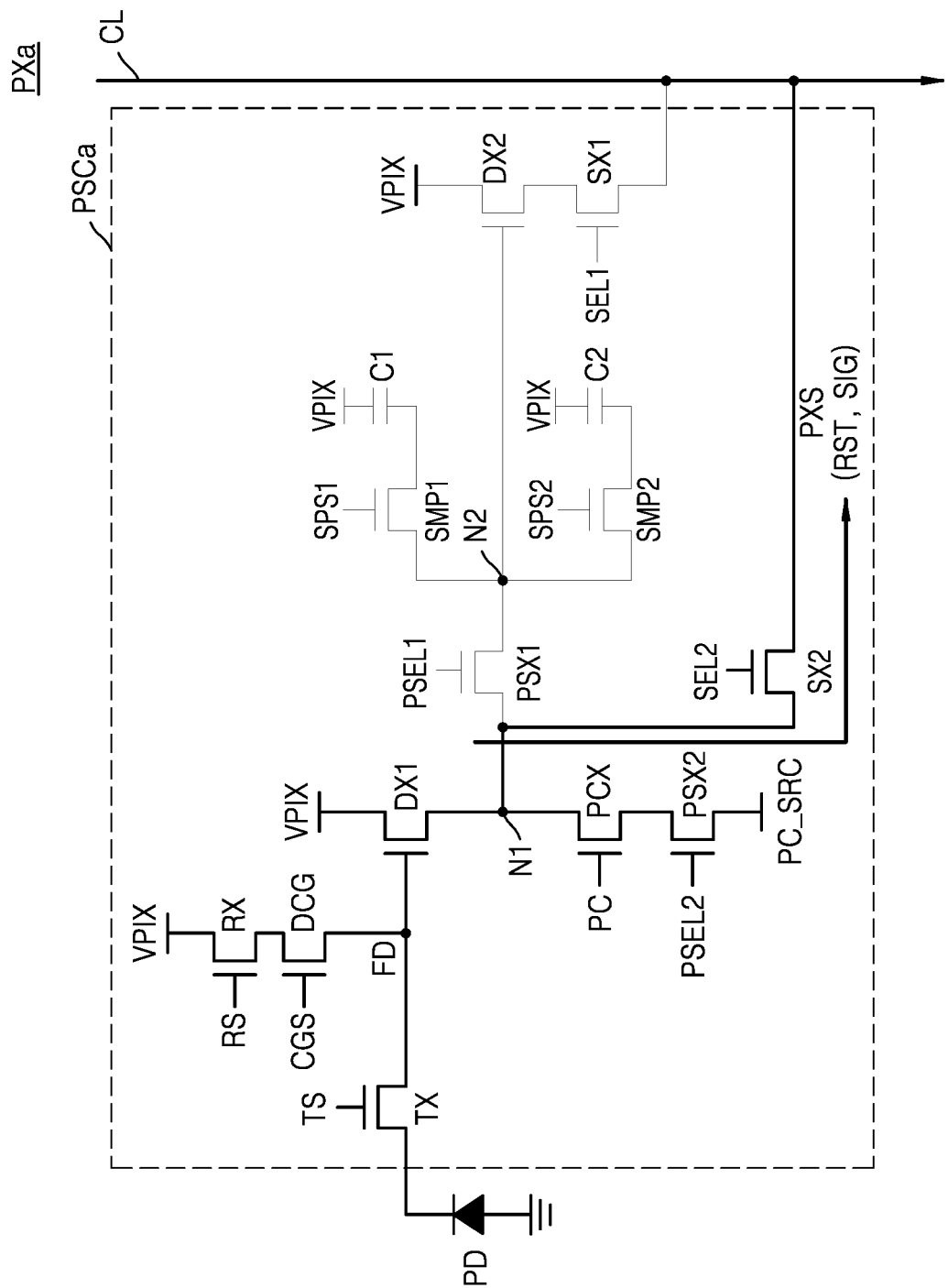

FIGS. 4A and 4B respectively illustrate the readout operations of the pixel PXa in the global shutter mode and the rolling shutter mode, according to an embodiment.

Referring to FIG. 4A, when the pixel PXa operates in the global shutter mode, the first selection transistor SX1 may be turned on and the second selection transistor SX2 may be turned off. In the global signal dumping period, the reset voltage RST and the image voltage SIG respectively stored in the first capacitor C1 and the second capacitor C2 may be output to the column line CL through the first selection transistor SX1 as the pixel signal PXS.

Referring off FIG. 4B, when the pixel PXa operates in the rolling shutter mode, the first selection transistor SX1 may be turned off and the second selection transistor SX2 may be turned on. In this case, the first sampling transistor SMP1, the second sampling transistor SMP2, and the first precharge selection transistor PSX1 operating as the sampling circuit may be turned off The reset voltage RST and the image voltage SIG may be output to the column line CL through the second selection transistor SX2 as the pixel signal PXS.

FIG. 5 is a timing diagram illustrating control signals and a ramp signal provided to a pixel, according to an embodiment.

FIG. 5 illustrates the control signals and the ramp signal provided to the pixel PXa in the global signal dumping period GSDP and the rolling readout period ROP when the pixel PXa of FIG. 3 operates in the global shutter mode. Descriptions are given with reference to FIGS. 3 and 5.

When the pixel PXa operates in the global shutter mode, the second selection signal SEL2 may be at a low level and the second selection transistor SX2 may be turned off in response to the low-level second selection signal SEL2. In the present embodiment, it is assumed that the pixel PXa operates in the HCG mode. The conversion gain control transistor DCG may be turned off in response to the low-level gain control signal CGS. However, because the conversion gain control transistor DCG is connected between the reset transistor RX and the floating diffusion node FD, the conversion gain control transistor DCG may also be turned on when the reset transistor RX is turned on in order to reset the floating diffusion node FD.

In the global signal dumping period GSDP, the precharge signal PC, the first precharge selection signal PSEL1, and the second precharge selection signal PSEL2 may maintain a high level. Accordingly, the first driving transistor DX1 may operate and the signal output from the first driving transistor DX1 may be transmitted to the first node N1. In addition, in the global signal dumping period GSDP, the first selection signal SEL1 may be at a low level and the first selection transistor SX1 may be turned off in response to the low-level first selection signal SEL1.

The reset control signal RS and the gain control signal CGS may maintain a high level for a first reset time RT11 at the beginning of the global signal dumping period GSDP, and the reset transistor RX and the conversion gain control transistor DCG may be turned on in response to the high-level reset control signal RS and the high-level gain control signal CGS, so that the floating diffusion node FD is reset (or initialized). For example, the floating diffusion node FD may be reset to the pixel voltage VPIX. Thereafter, the gain control signal CGS may transition to a low level and the conversion gain control transistor DCG may be turned off in response to the low-level gain control signal CGS. Accordingly, the pixel PXa may operate in the HCG mode.

The first driving transistor DX1 may output, to the first node N1, the first voltage (e.g., the reset voltage) indicating the voltage level of the reset floating diffusion node FD.

The first sampling transistor SMP1 may be turned on in response to the high-level first sampling signal SPS1 for a first settling time ST1. The first capacitor C1 may be charged based on the first voltage of the first node N1 for the first settling time ST1. The first capacitor C1 may be charged until the first voltage is settled at the third node N3. Accordingly, the first voltage (e.g., the reset voltage) may be sampled in the first capacitor C1. For example, a voltage corresponding to the difference between the pixel voltage VPIX and the first voltage may be stored in the first capacitor C1. In an embodiment, when the ground voltage is applied to the second terminal of the first capacitor C1, the first voltage may be stored in the first capacitor C1.

Thereafter, in a transfer period TT, the transfer transistor TX may be turned on in response to the high-level transfer control signal TS, and charges (photocharges) generated by the photodiode PD may be transferred to the floating diffusion node FD. Charges may be integrated at the floating diffusion node FD. The first driving transistor DX1 may output, to the second node N2, the second voltage (e.g., the image voltage) indicating the voltage of the floating diffusion node FD at which charges are integrated.

The second sampling transistor SMP2 may be turned on in response to the high-level second sampling signal SPS2 for a second settling time ST2. The second capacitor C2 may be charged based on the second voltage for the second settling time ST2. The second capacitor C2 may be charged until the second voltage is settled at the fourth node N4. Accordingly, the second voltage (e.g., the image voltage) may be sampled in the second capacitor C2. For example, a voltage corresponding to the difference between the pixel voltage VPIX and the second voltage may be stored in the second capacitor C2. In an embodiment, when the ground voltage is applied to the second terminal of the second capacitor C2, the second voltage may be stored in the second capacitor C2.

Thereafter, in a rolling readout period ROP, the first voltage (e.g., the reset voltage) and the second voltage (e.g., the image voltage) respectively sampled in the first capacitor C1 and the second capacitor C2 may be read out. In the rolling readout period ROP, the precharge signal PC and the first selection signal SEL1 may maintain a high level and the precharge transistor PCX may maintain an on state in response to the high-level precharge signal PC.

The reset transistor RX and the conversion gain control transistor DCG may be respectively turned on for a second reset time RT12 in response to the high-level reset control signal RS and the high-level conversion gain control signal CGS, so that the floating diffusion node FD is reset. At this time, the transfer transistor TX may be turned on in response to the high-level transfer control signal RS for at least a part of the second reset time RT12, so that photocharges remaining in the photodiode are removed.

The first precharge selection transistor PSX1 and the second precharge selection transistor PSX2 may be turned on for a first precharge time PT1 in response to the high-level first precharge selection signal PSEL1 and the high-level second precharge selection signal PSEL2. In an embodiment, the first precharge time PT1 may overlap at least a part of the second reset time RT12. The second node N2 may be precharged based on the first voltage indicating the reset level of the floating diffusion node FD. According to aspects of the inventive concept, precharging the second node N2 may have the same meaning as resetting the second node N2.

Thereafter, in a first charge sharing period CS1, the first sampling transistor SMP1 may be turned on in response to the high-level first sampling signal SPS1. The second node N2 and the third node N3 may be connected to each other so that charge sharing occurs between the second node N2 and the third node N3. Accordingly, the second node N2 may be settled to the first voltage of the third node N3. The second driving transistor DX2 may generate the reset voltage RST corresponding to the first voltage. The first selection transistor SX1 may output the reset voltage RST to the column line CL.

After the first sampling transistor SMP1 is turned on during the first charge sharing period CS1, the ramp signal RAMP may decrease (or increase) with a constant slope for a reset readout time RRT.

For the reset readout time RRT, the CDS circuit (see 150 of FIG. 1) may compare the ramp signal RAMP with the pixel signal PXS (i.e., the reset voltage RST) output through the column line CL. Accordingly, the ADC circuit (see 140 in FIG. 1) may convert the reset voltage RST into a reset value that is a digital value.

After the reset readout time RRT has elapsed and the first sampling control signal SPS1 transitions from a high level to a low level, the first precharge selection transistor PSX1 and the second precharge selection transistor PSX2 may be respectively turned on for the second precharge time PT2 in response to the high-level first precharge selection signal PSEL1 and the high-level second precharge selection signal PSEL2. The second node N2 may be precharged based on the first voltage indicating the reset level of the floating diffusion node FD. For example, the second node N2 may be reset.

As described above, because the second node N2 is precharged for the first precharge time PT1 and the second precharge time PT2, the voltage level of the second node N2 may be prevented from changing due to external changes (e.g., charge injection or clock feedthrough when the first sampling transistor SMP1 is turned off). Accordingly, a dark offset for each pixel may be minimized.

Thereafter, in a second charge sharing period CS2, the second sampling transistor SMP2 may be turned on in response to the high-level second sampling signal SPS2. The second node N2 and the fourth node N4 may be connected to each other so that charge sharing occurs between the second node N2 and the fourth node N4. Accordingly, the second node N2 may be settled to the second voltage. The second driving transistor DX2 may generate the image voltage SIG corresponding to the second voltage. The first selection transistor SX1 may output the image voltage SIG to the column line CL.

After the second sampling transistor SMP2 is turned on during the second charge sharing period CS2, the ramp signal RAMP may decrease (or increase) with a constant slope for an image readout time SRT.

For the image readout time SRT, the CDS circuit (see 150 of FIG. 1) may compare the ramp signal RAMP with the pixel signal PXS (i.e., the image voltage SIG) output through the column line CL. Accordingly, the ADC circuit (see 140 in FIG. 1) may convert the image voltage SIG into an image value that is a digital value. Accordingly, the readout operation of the pixels PXa in one row of the pixel array (see 110 of FIG. 1) operating in the global shutter mode may be completed.

Figure 6A:
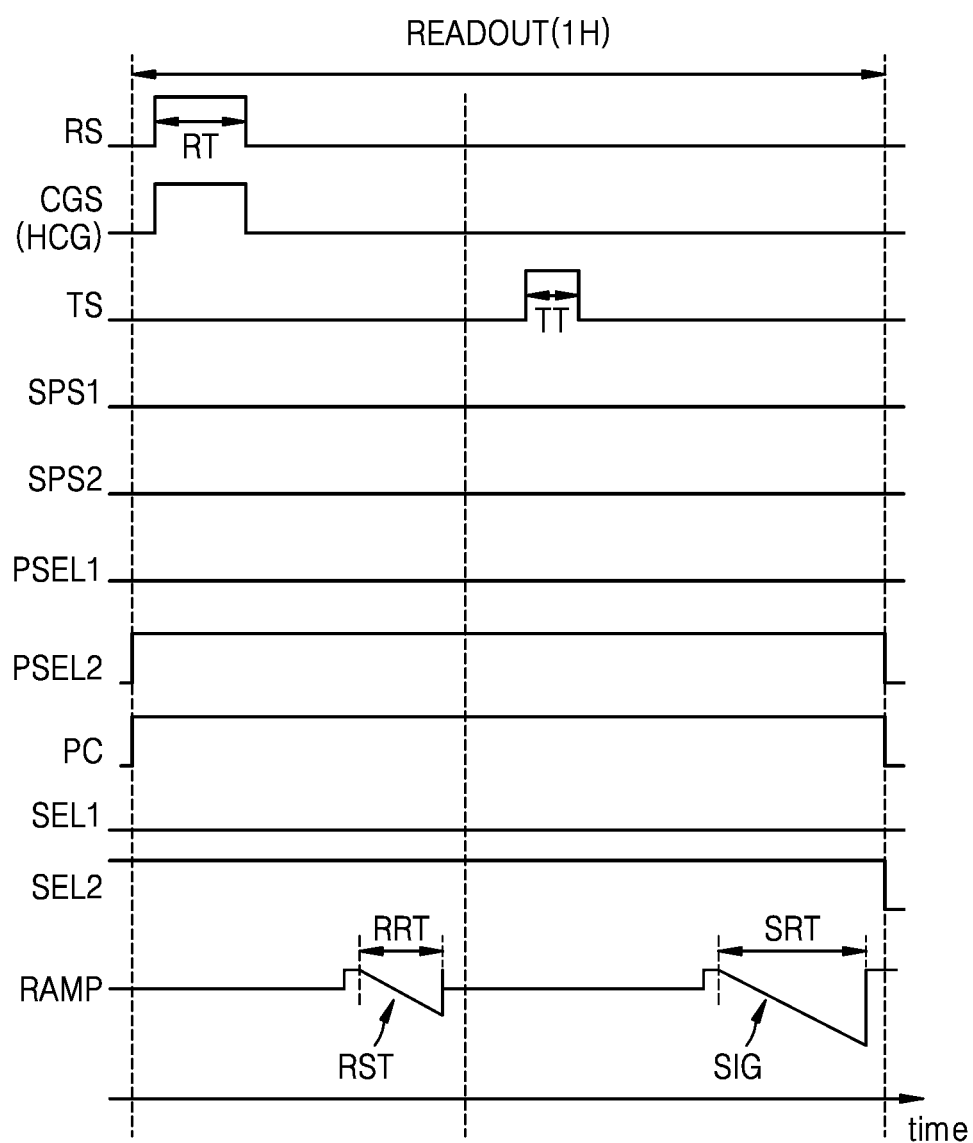
FIGS. 6A and 6B are timing diagrams illustrating control signals and a ramp signal provided to a pixel, according to an embodiment.
Figure 6B:
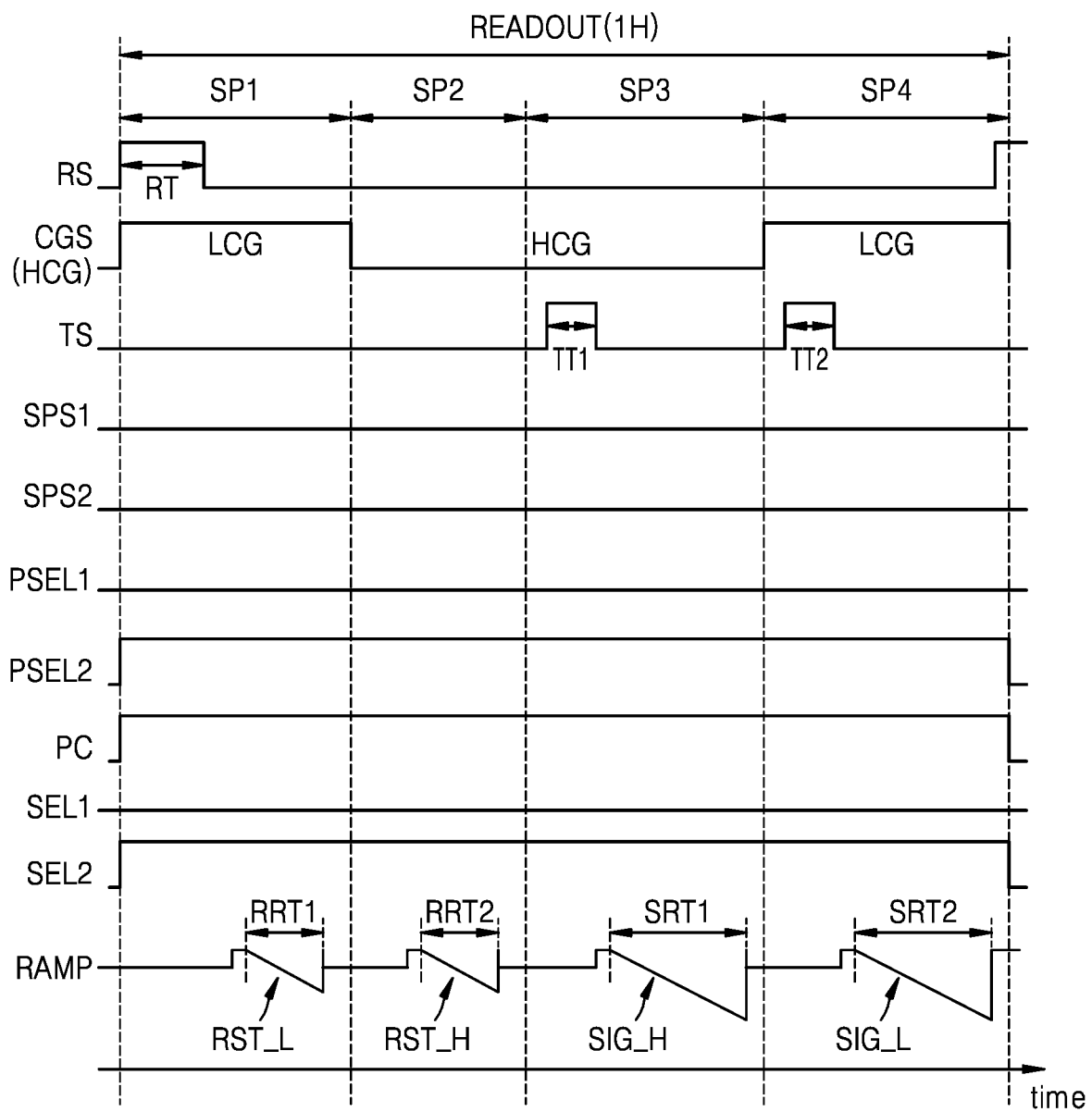

FIGS. 6A and 6B are timing diagrams illustrating control signals and a ramp signal provided to a pixel, according to an embodiment.

FIG. 6A illustrates the control signals and the ramp signal provided to the pixel PXa of FIG. 3 when the pixel PXa operates in a rolling shutter mode and an HCG mode, and FIG. 6B illustrates the control signals and the ramp signal provided to the pixel PXa of FIG. 3 when the pixel PXa operates in a rolling shutter mode and an intra dual conversion gain mode. Hereinafter, descriptions are given with reference to FIGS. 3, 6A, and 6B.

Referring to FIGS. 3, 6A, and 6B, the pixels PXa of one row of the pixel array (see 110 of FIG. 1) may be read out during a readout period, for example, one horizontal period 1H.

When the pixel PXa operates in the rolling shutter mode, the first selection signal SEL1, the first sampling signal SPS1, the second sampling signal SPS2, and the first precharge selection signal PSEL1 are at a low level, and the first selection transistor SX1, the first sampling transistor SMP1, the second sampling transistor SMP2, and the first precharge selection transistor PSX1 may be turned off. The precharge signal PC and the second precharge selection signal PSEL2 are at a high level, and the precharge transistor PCX and the second precharge selection transistor PSX2 may be turned on.

Referring to FIG. 6A, the conversion gain control transistor DCG may be turned off in response to the low-level gain control signal CGS. However, because the conversion gain control transistor DCG is connected between the reset transistor RX and the floating diffusion node FD, the conversion gain control transistor DCG may also be turned on when the reset transistor RX is turned on in order to reset the floating diffusion node FD.

The reset control signal RS and the gain control signal CGS may maintain a high level for a first reset time RT, and the reset transistor RX and the conversion gain control transistor DCG may be respectively turned on in response to the high-level reset control signal RS and the high-level gain control signal CGS, so that the floating diffusion node FD is reset. For example, the floating diffusion node FD may be reset to the pixel voltage VPIX. In an embodiment, the reset time RT may continue from before the readout period (e.g., the integration period of FIG. 2B). Thereafter, the gain control signal CGS may transition to a low level and the conversion gain control transistor DCG may be turned off in response to the low-level gain control signal CGS. Accordingly, the pixel PXa may operate in the HCG mode.

The first driving transistor DX1 may output, to the first node N1, the first voltage (e.g., the reset voltage) indicating the voltage level of the reset floating diffusion node FD.

When the pixel PXa operates in the rolling shutter mode, the second selection signal SEL2 may maintain a low level during the readout period and the second selection transistor SX2 may be turned on in response to the high-level second selection signal SEL2. The second selection transistor SX2 may output the first voltage (i.e., the reset voltage RST), which is output from the first node N1, to the column line CL as the pixel signal PSX.

The ramp signal RAMP may decrease (or increase) with a constant slope for a reset readout time RRT.

For the reset readout time RRT, the CDS circuit (see 150 of FIG. 1) may compare the ramp signal RAMP with the pixel signal PXS (i.e., the reset voltage RST) output through the column line CL. Accordingly, the ADC circuit (see 140 in FIG. 1) may convert the reset voltage RST into a reset value that is a digital value.

Thereafter, the transfer control signal TS may transition from a low level to a high level, and the transfer transistor TX may be turned on during a transfer period TT in response to the high-level transfer control signal TS. The transfer transistor TX may transfer photocharges generated and integrated by the photodiode PD to the floating diffusion node FD.

The first driving transistor DX1 may output, to the first node N1, the second voltage (e.g., the image voltage SIG) indicating the voltage level of the floating diffusion node FD at which photocharges are integrated. The second selection transistor SX2 may output the second voltage (e.g., the image voltage SIG), which is output from the first node N1, to the column line CL as the pixel signal PSX.

The ramp signal RAMP may decrease (or increase) with a constant slope for the image readout time SRT. For an image readout time SRT, the CDS circuit (see 150 of FIG. 1) may compare the ramp signal RAMP with the pixel signal PXS (i.e., the image voltage SIG) output through the column line CL. Accordingly, the ADC circuit (see 140 in FIG. 1) may convert the image voltage SIG into an image value that is a digital value.

Accordingly, the readout operation of the pixels PXa of one row of the pixel array (see 110 of FIG. 1) operating in the rolling shutter mode and the HCG mode may be completed.

Referring to FIG. 6B, the gain control signal CGS may be at a high level during a first sub-period SP1 and a fourth sub-period SP4 of a readout period, and the gain control signal CGS may be at a low level during a second sub-period SP2 and a third sub-period SP3 of the readout period. For example, the pixel PXa may operate in an LCG mode during the first and fourth sub-periods SP1 and SP4 and may operate in an HCG mode during the second and third sub-periods SP2 and SP3. For example, the pixel PXa may operate in a dual conversion gain mode during one readout period after one exposure. Accordingly, the pixel array (see 110 of FIG. 1) may operate in the dual conversion gain mode during one frame.

The conversion gain control transistor DCG may be turned on in response to the high-level gain control signal CGS during the first sub-period SP1, and the pixel PXa may operate in the LCG mode.

The reset control signal RS may maintain a high level for a reset time RT, and the reset transistor RX may be turned on in response to the high-level reset control signal RS, so that the floating diffusion node FD is reset. For example, the floating diffusion node FD may be reset to the pixel voltage VPIX.

The first driving transistor DX1 may output, to the first node N1, a first reset voltage RST_L indicating the voltage level of the reset floating diffusion node FD in the LCG mode. The first reset voltage RST_L indicates the reset voltage in LCG mode. The second selection transistor SX2 may output the first reset voltage RST_L to the column line CL as the pixel signal PSX.

The ramp signal RAMP may decrease (or increase) with a constant slope for a first reset readout time RRT1. For the first reset readout time RRT1, the CDS circuit (see 150 of FIG. 1) may compare the ramp signal RAMP with the pixel signal PXS (i.e., the first reset voltage RST_L) output through the column line CL. Accordingly, the ADC circuit (see 140 in FIG. 1) may convert the first reset voltage RST_L into a first reset value that is a digital value.

Thereafter, the gain control signal CGS may transition from a high level to a low level. The conversion gain control transistor DCG may be turned off in response to the low-level gain control signal CGS during the second sub-period SP2, and the pixel PXa may operate in the HCG mode.

As the conversion gain control transistor DCG is turned off, the voltage level of the reset floating diffusion node FD may change. For example, capacitance of a parasitic capacitor between the gate terminal of the conversion gain control transistor DCG and the floating diffusion node FD may change. Accordingly, the voltage level of the floating diffusion node FD may change.

The first driving transistor DX1 may output, to the first node N1, a second reset voltage RST_H indicating the voltage level of the reset floating diffusion node FD in the HCG mode. The second reset voltage RST_H indicates the reset voltage in the HCG mode. The second selection transistor SX2 may output the second reset voltage RST_H to the column line CL as the pixel signal PSX.

The ramp signal RAMP may decrease (or increase) with a constant slope for a second reset readout time RRT2. For the second reset readout time RRT2, the CDS circuit (see 150 of FIG. 1) may compare the ramp signal RAMP with the second reset voltage RST_H. Accordingly, the ADC circuit (see 140 in FIG. 1) may convert the second reset voltage RST_H into a second reset value that is a digital value.

In the third sub-period SP3, the gain control signal CGS may continue to maintain a low level. The conversion gain control transistor DCG may be turned off in response to the low-level gain control signal CGS, and the pixel PXa may operate in the HCG mode.

In a first transfer period TT1, the transfer control signal TS may toggle to a high level. The transfer transistor TX may be turned on in response to the high-level transfer control signal TS, so that photocharges generated and integrated by the photodiode PD are transferred to the floating diffusion node FD. The voltage level of the floating diffusion node FD may be lowered.

The first driving transistor DX1 may output, to the first node N1, a second image voltage SIG_H indicating the voltage level of the floating diffusion node FD at which photocharges are integrated in the HCG mode. The second image voltage SIG_H indicates the image voltage in the HCG mode. The second selection transistor SX2 may output the second image voltage SIG_H to the column line CL as the pixel signal PSX.

The ramp signal RAMP may decrease (or increase) with a constant slope for a first image readout time SRT1. The CDS circuit (see 150 of FIG. 1) may compare the ramp signal RAMP with the second image voltage SIG_H for the first image readout time SRT1. Accordingly, the ADC circuit (see 140 of FIG. 1) may convert the second image voltage SIG_H into a second image value that is a digital value.

Thereafter, the gain control signal CGS may transition from a low level to a high level. The conversion gain control transistor DCG may be turned on in response to the high-level gain control signal CGS during the fourth sub-period SP4, and the pixel PXa may operate in the LCG mode.

As the conversion gain control transistor DCG is turned on, capacitance of a parasitic capacitor formed at the floating diffusion node FD may increase more than capacitance in the second sub-period SP2. Accordingly, the voltage level of the floating diffusion node FD may be lowered.

In a second transfer period TT2, the transfer control signal TS may toggle to a high level. The transfer transistor TX may be turned on in response to the high-level transfer control signal TS, so that photocharges remaining in the photodiode PD and photocharges generated and integrated at the photodiode PD from after the first transfer period TT1 to before the second transfer period TT2 are transferred to the floating diffusion node FD.

The first driving transistor DX1 may output, to the first node N1, a first image voltage SIG_L indicating the voltage level of the floating diffusion node FD at which photocharges are integrated in the LCG mode. The first image voltage SIG_L indicates the image voltage in the LCG mode. The second selection transistor SX2 may output the first image voltage SIG_L to the column line CL as the pixel signal PSX.

The ramp signal RAMP may decrease (or increase) with a constant slope for a second image readout time SRT2. The CDS circuit (see 150 of FIG. 1) may compare the ramp signal RAMP with the first image voltage SIG_L for the second image readout time SRT2. Accordingly, the ADC circuit (see 140 of FIG. 1) may convert the first image voltage SIG_L into a first image value that is a digital value.

A value obtained by subtracting the first reset value from the first image value may be generated as the pixel value in the LCG mode, and a value obtained by subtracting the second reset value from the second image value may be generated as the pixel value in the HCG mode. LCG image data may be generated based on a plurality of pixel values in the LCG mode, and HCG image data may be generated based on a plurality of pixel values in the HCG mode. The luminance of the HCG image data may be different from the luminance of the LCG image data. The signal processor (see 190 of FIG. 1) or the external processor may generate high dynamic range (HDR) image data by merging the LCG image data with the HCG image data.

Figure 7:
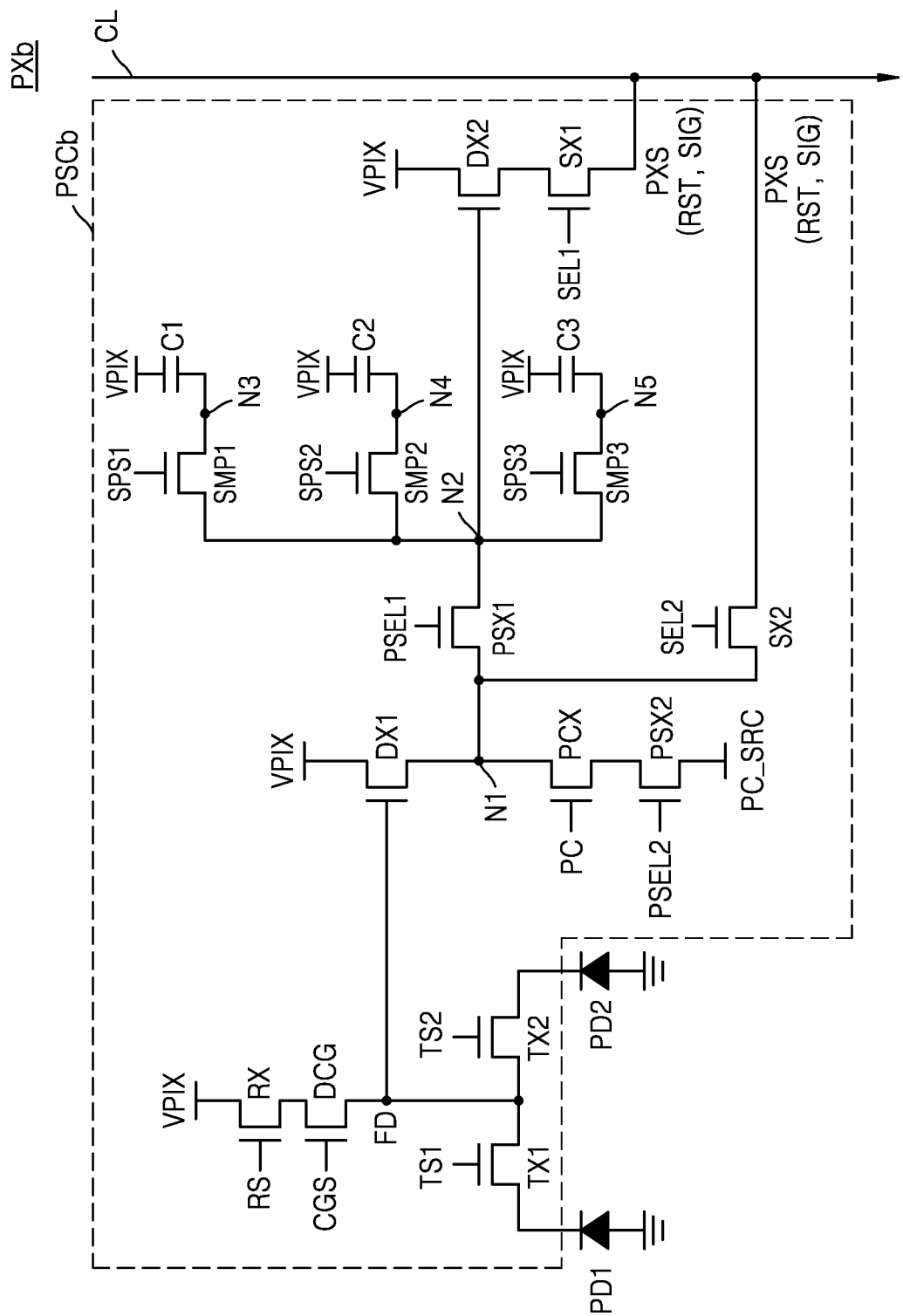
FIG. 7 is a circuit diagram illustrating a pixel according to an embodiment.

FIG. 7 is a circuit diagram illustrating a pixel PXb according to an embodiment.

Referring to FIG. 7, the pixel PXb may include a first photodiode PD1, a second photodiode PD2, and a pixel signal generation circuit PSCb. The pixel signal generation circuit PSCb may include a plurality of transistors, a first capacitor C1, a second capacitor C2, and a third capacitor C3. The transistors may include a first transfer transistor TX1, a second transfer transistor TX2, a reset transistor RX, a conversion gain control transistor DCG, a first driving transistor DX1, a first precharge selection transistor PSX1, a second precharge selection transistor PSX2, a precharge transistor PCX, a first sampling transistor SMP1, a second sampling transistor SMP2, a third sampling transistor SMP3, a second driving transistor DX2, a first selection transistor SX1, and a second selection transistor SX2. Control signals may be applied to the pixel signal generation circuit PSCb. The control signals may include a first transfer control signal TS1, a second transfer control signal TS2, a reset control signal RS, a gain control signal CGS, a first precharge selection signal PSEL1, a second precharge selection signal PSEL2, a precharge signal PC, a first sampling control signal SPS1, a second sampling control signal SPS2, a third sampling control signal SPS3, a first selection signal SEL1, and a second selection signal SEL2. At least some of the control signals may be generated by the row driver (see 120 of FIG. 1).

Comparing FIG. 7 with FIG. 3, the pixel PXa of FIG. 3 may include the photodiode PD and the transfer transistor TX, and the pixel PXb of FIG. 7 may include the first photodiode PD1, the first transfer transistor TX1, the second photodiode PD2, and the second transfer transistor TX2. For example, the pixel PXb may further include one pair of photodiodes and one pair of transfer transistors corresponding to the pair of photodiodes.

In addition, the pixel PXa of FIG. 3 may include the first capacitor C1, the second capacitor C2, the first sampling transistor SMP1 connected between the first capacitor C1 and the second node N2, and the second sampling transistor SMP2 connected between the second capacitor C2 and the second node N2, and the pixel PXb of FIG. 7 may further include the third capacitor C3 and the third sampling transistor SMP3 connected between the third capacitor C3 and the second node N2.

The first transfer transistor TX1 may be connected between the first photodiode PD1 and a floating diffusion node FD. The first transfer transistor TX1 may be turned on or off in response to the first transfer control signal TS1. The first transfer transistor TX1 may be turned on so that photocharges generated by the first photodiode PD1 are transferred to the floating diffusion node FD.

The second transfer transistor TX2 may be connected between the second photodiode PD2 and the floating diffusion node FD. The second transfer transistor TX2 may be turned on or off in response to the second transfer control signal TS2. The second transfer transistor TX2 may be turned on so that photocharges generated by the second photodiode PD2 are transferred to the floating diffusion node FD.

The first sampling transistor SMP1, the second sampling transistor SMP2, the third sampling transistor SMP3, the first capacitor C1, the second capacitor C2, and the third capacitor C3 may operate as a sampling circuit that samples a first voltage (e.g., a reset voltage), a second voltage (e.g., a first image voltage), and a third voltage (e.g., a second image voltage) output through the first node N1 when the pixel PXb operates in a global shutter mode. The first image voltage may be an image voltage generated to correspond to the voltage level of the floating diffusion node FD when photocharges generated by the first photodiode PD1 are integrated at the floating diffusion node FD. The second image voltage may be an image voltage generated to correspond to the voltage level of the floating diffusion node FD when photocharges generated by the second photodiode PD2 or photocharges generated by the first and second photodiodes PD1 and PD2 are integrated at the floating diffusion node FD.

A first terminal of the first sampling transistor SMP1 may be connected to the second node N2, and a second terminal of the first sampling transistor SMP1 may be connected to a third node N3. A first terminal of the first capacitor C1 may be connected to the third node N3, and a pixel voltage VPIX may be applied to a second terminal of the first capacitor C1. In an embodiment, a ground voltage may be applied to the second terminal of the first capacitor C1. The first sampling transistor SMP1 may be turned on or off in response to the first sampling control signal SPS1. The first sampling transistor SMP1 may be turned on so that the first capacitor C1 is connected to the second node N2.

A first terminal of the second sampling transistor SMP2 may be connected to the second node N2, and a second terminal of the second sampling transistor SMP2 may be connected to a fourth node N4. A first terminal of the second capacitor C2 may be connected to the fourth node N4, and the pixel voltage VPIX may be applied to a second terminal of the second capacitor C2. In an embodiment, the ground voltage may be applied to the second terminal of the second capacitor C2. The second sampling transistor SMP2 may be turned on or off in response to the second sampling control signal SPS2. The second sampling transistor SMP2 may be turned on so that the second capacitor C2 is connected to the second node N2.

A first terminal of the third sampling transistor SMP3 may be connected to the second node N2, and a second terminal of the third sampling transistor SMP3 may be connected to a fifth node N5. A first terminal of the third capacitor C3 may be connected to the fifth node N5, and the pixel voltage VPIX may be applied to a second terminal of the fourth capacitor C4. In an embodiment, the ground voltage may be applied to the second terminal of the third capacitor C3. The third sampling transistor SMP3 may be turned on or off in response to the third sampling control signal SPS3. The third sampling transistor SMP3 may be turned on so that the third capacitor C3 is connected to the third node N3.

The first capacitor C1 may sample the reset voltage according to the reset operation, the second capacitor C2 may sample the first image voltage, and the third capacitor C3 may sample the second image voltage.

Operations of other configurations of the pixel PXb, for example, the reset transistor RX, the conversion gain control transistor DCG, the first driving transistor DX1, the first precharge selection transistor PSX1, the second precharge selection transistor PSX2, the precharge transistor PCX, the first sampling transistor SMP1, the second sampling transistor SMP2, the second driving transistor DX2, the first selection transistor SX1, and the second selection transistor SX2 are the same as those of the pixel PXa of FIG. 3, and thus, redundant descriptions thereof are omitted.

Figure 8A:
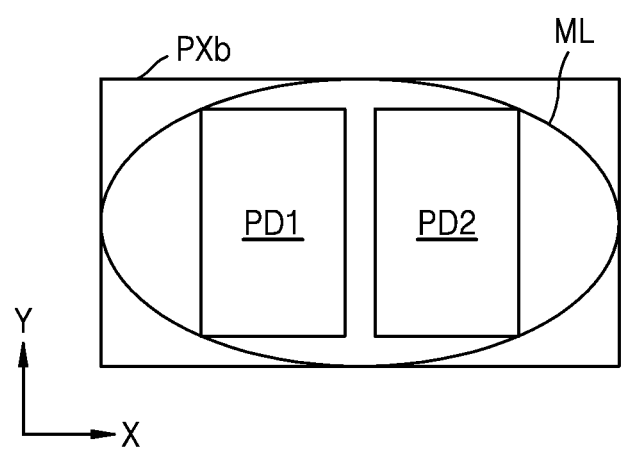
FIG. 8A is a plan view of the pixel of FIG. 7
Figure 8B:
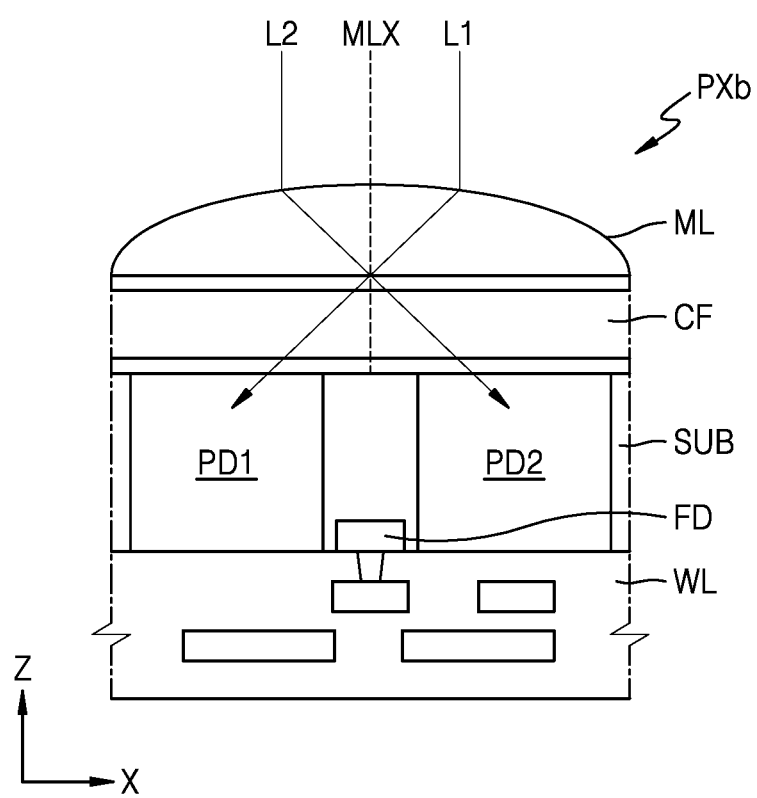
FIG. 8B is a vertical cross-sectional view of the pixel of FIG. 7.

FIG. 8A is a plan view of the pixel PXb of FIG. 7 and FIG. 8B is a vertical cross-sectional view of the pixel PXb of FIG. 7.

Referring to FIGS. 8A and 8B, the pixel PXb may include a microlens ML, a color filter CF, first and second photodiodes PD1 and PD2, a floating diffusion node FD, and a wiring layer WL.

The color filter CF may be disposed below the microlens ML, and the first and second photodiodes PD1 and PD2 may be disposed below the color filter CF. The first and second photodiodes PD1 and PD2 may be formed on a substrate SUB, and the floating diffusion node FD may also be formed on the substrate SUB. Although not illustrated, transistors, for example, the reset transistor RX, the conversion gain control transistor DCG, the first driving transistor DX1, the first precharge selection transistor PSX1, the second precharge selection transistor PSX2, the precharge transistor PCX, the first sampling transistor SMP1, the second sampling transistor SMP2, the second driving transistor DX2, the first selection transistor SX1, and the second selection transistor SX2 may be formed on the substrate SUB. Wiring lines through which the transistors are connected to each other and row lines through which control signals of the transistors are transmitted may be formed in the wiring layer WL.

In the present embodiment, the first photodiode PD1 and the second photodiode PD2 may be arranged side-by-side below the microlens ML. The first photodiode PD1 and the second photodiode PD2 may be respectively disposed on the left and right (or top and bottom) with respect to an optical axis MLX of the microlens ML. The first photodiode PD1 may receive a first light signal L1 collected through the right side of the optical axis MLX, and the second photodiode PD2 may receive a second light signal L2 collected through the left side of the optical axis MLX.

The image sensor (see 100 of FIG. 1) may generate autofocus data for autofocus of an imaging device. The pixel PXb of FIG. 7 may generate a first pixel value and a second pixel value based on the first light signal L1 and the second light signal L2. A binocular disparity signal generated based on the first pixel value and the second pixel value may be used as autofocus data. The pixel PXb of FIG. 7 may be a focus pixel used to generate autofocus data.

In an embodiment, a plurality of pixels PX included in the pixel array (see 110 of FIG. 1) may be focus pixels. In an embodiment, some pixels PX included in the pixel array (see 110 of FIG. 1) may be focus pixels. For example, the focus pixels may be disposed between the pixels PX of the pixel array (see 110 of FIG. 1).

Figure 9B:
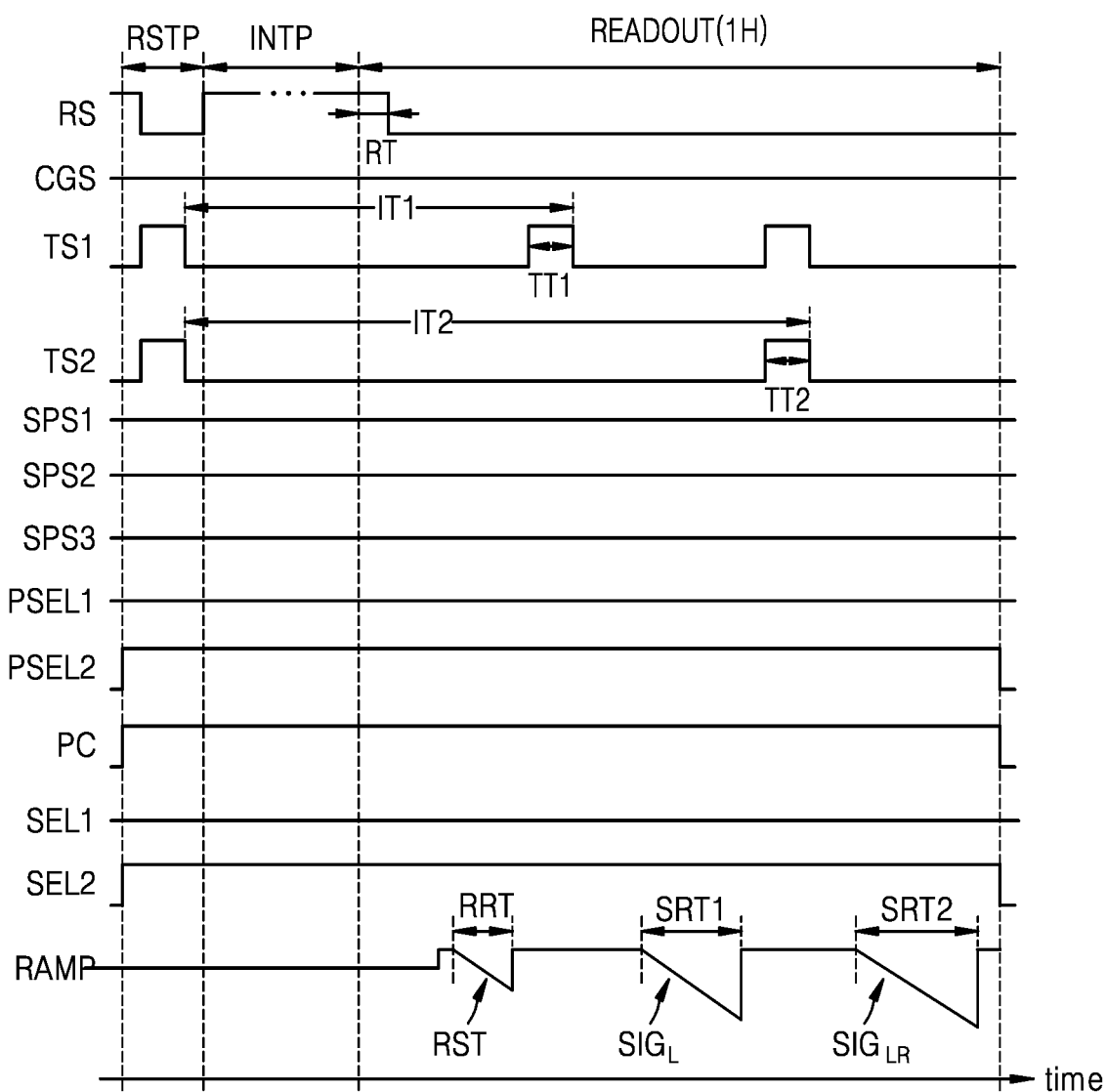

FIGS. 9A and 9B are timing diagrams illustrating the control signals and the ramp signal provided to the pixel PXb of FIG. 7, according to an embodiment.

FIG. 9A illustrates the control signals and the ramp signal provided to the pixel PXb of FIG. 7 in the global signal dumping period GSDP and the rolling readout period ROP when the pixel PXb of FIG. 7 operates in the global shutter mode, and FIG. 9B illustrates the control signals and the ramp signal provided to the pixel PXb of FIG. 7 in the readout period when the pixel PXb of FIG. 7 operates in the rolling shutter mode. Descriptions are given with reference to FIGS. 7, 9A, and 9B.

In FIGS. 9A and 9B, it is assumed that the pixel PXb operates in the LCG mode. Therefore, the gain control signal CGS may be at a high level. When the pixel PXb operates in the HCG mode, the gain control signal CGS may be at a low level. However, when the reset control signal RS is at a high level, the gain control signal CGS may also be at a high level.

Referring to FIGS. 7 and 9A, because the pixel PXb operates in the global shutter mode, the second selection signal SEL2 may be at a low level and the second selection transistor SX2 may be turned off in response to the low-level second selection signal SEL2.

The first and second transfer transistors TX1 and TX2 may be turned on in response to the high-level first and second transfer control signals TS1 and TS2 during a partial period of a reset period RSTP, and photocharges remaining in the first and second photodiodes PD1 and PD2 may be transferred to the floating diffusion node FD. Accordingly, the first and second photodiodes PD1 and PD2 may be reset. The resetting of the photodiode means that photocharges are removed. Thereafter, the reset control signal RS may transition from a low level to a high level and the floating diffusion node FD may be reset. Accordingly, photocharges transferred to the floating diffusion node FD may be removed.

In an integration period INTP, the first and second photodiodes PD1 and PD2 may generate and integrate photocharges based on the received light signals.

In a global signal dumping period GSDP, the precharge signal PC, the first precharge selection signal PSEL1, and the second precharge selection signal PSEL2 may maintain a high level. Accordingly, the first driving transistor DX1 may operate and the signal output from the first driving transistor DX1 may be sampled in the first capacitor C1, the second capacitor C2, and the third capacitor C3.

The first sampling transistor SMP1 may be turned on for a first settling time ST1 in response to the high-level first sampling signal SPS1, and the first capacitor C1 may be charged until the first voltage is settled at the third node N3 based on the first voltage (e.g., the reset voltage) corresponding to the voltage level of the reset floating diffusion node FD. Accordingly, the first voltage (e.g., the reset voltage) may be sampled in the first capacitor C1.

Thereafter, the first transfer control signal TS1 may transition from a low level to a high level. In a first transfer period TT1, the first transfer transistor TX1 may be turned on in response to the high-level first transfer control signal TS1, and photocharges generated by the first photodiode PD for a first integration time IT1 may be transferred to the floating diffusion node FD. Photocharges generated by the first photodiode PD1 may be integrated at the floating diffusion node FD, and the first driving transistor DX1 may output, to the first node N1, the second voltage (e.g., the first image voltage) corresponding to the voltage level of the floating diffusion node FD at which the photocharges are integrated.

The second sampling transistor SMP2 may be turned on for a second settling time ST2 in response to the high-level second sampling signal SPS2, and the second capacitor C2 may be charged until the second voltage is settled at the fourth node N4 based on the second voltage. Accordingly, the second voltage (e.g., the first image voltage) may be sampled in the second capacitor C2. As described above with reference to FIG. 8B, the first image voltage may be a pixel signal corresponding to the first light signal (see L1 of FIG. 8B) collected through the right side of the optical axis MLX of the pixel PXb.

Thereafter, the first and second transfer control signals TS1 and TS2 may transition from a low level to a high level. In the second transfer period TT2, the second transfer transistor TX2 may be turned on in response to the high-level second transfer control signal TS2, so that photocharges generated by the second photodiode PD2 for the second integration time IT2 are transferred to the floating diffusion node FD. In addition, the first transfer transistor TX1 may be turned on in response to the high-level first transfer control signal TS1, so that photocharges remaining in the first photodiode PD and photocharges generated after the first transfer period TT1 are transferred to the floating diffusion node FD. Photocharges generated by the first photodiode PD1 and the second photodiode PD2 may be integrated at the floating diffusion node FD, and the first driving transistor DX1 may output, to the first node N1, the third voltage (e.g., the second image voltage) corresponding to the voltage level of the floating diffusion node FD at which the photocharges are integrated.

The third sampling transistor SMP3 may be turned on for a third settling time ST3 in response to the high-level third sampling signal SPS3, and the third capacitor C3 may be charged until the third voltage is settled at the fifth node N5 based on the third voltage. Accordingly, the third voltage (e.g., the second image voltage) may be sampled in the third capacitor C3. The second image voltage may be a pixel signal corresponding to the sum of the first light signal (see L1 of FIG. 8B) and the second light signal (see L2 of FIG. 8B), that is, the entire light signal received by the pixel PXb.

Thereafter, the floating diffusion node FD may be reset in response to the high-level reset control signal RS for a reset time RT. The first and second precharge selection transistors PSX1 and PSX2 may be respectively turned on in response to the high-level first and second precharge selection signals PSEL1 and PSEL2 for a first precharge time PT1. Accordingly, the second node N2 may be precharged based on the first voltage indicating the reset level of the floating diffusion node FD output from the first driving transistor DX1.

Thereafter, in a first charge sharing period CS1, the first sampling transistor SMP1 may be turned on in response to the high-level first sampling signal SPS1. The second node N2 and the third node N3 may be connected to each other so that charge sharing occurs between the second node N2 and the third node N3. Accordingly, the second node N2 may be settled to the first voltage of the third node N3. The second driving transistor DX2 may generate the reset voltage RST corresponding to the first voltage. The first selection transistor SX1 may output the reset voltage RST to the column line CL.

After the first sampling transistor SMP1 is turned on during the first charge sharing period CS1, the ramp signal RAMP may decrease (or increase) with a constant slope for the reset readout time RRT.

The CDS circuit (see 150 of FIG. 1) may compare the ramp signal RAMP with the pixel signal PXS (i.e., the reset voltage RST) output through the column line CL for a reset readout time RRT. Accordingly, the ADC circuit (see 140 of FIG. 1) may convert the reset voltage RST into a reset value that is a digital value.

After the reset readout time RRT has elapsed and the first sampling control signal SPS1 transitions from a high level to a low level, the first and second precharge selection transistors PSX1 and PSX2 may be respectively turned on for a second precharge time PT2 in response to the high-level first and second precharge selection signals PSEL1 and PSEL2. The second node N2 may be precharged based on the first voltage indicating the reset level of the floating diffusion node FD.

In a second charge sharing period CS2, the second sampling transistor SMP2 may be turned on in response to the high-level second sampling signal SPS2. The second node N2 and the fourth node N4 may be connected to each other so that charge sharing occurs between the second node N2 and the fourth node N4. Accordingly, the second node N2 may be settled to the second voltage. The second driving transistor DX2 may generate the first image voltage $SIG_L$ corresponding to the second voltage. The first selection transistor SX1 may output the first image voltage $SIG_L$ to the column line CL.

After the second sampling transistor SMP2 is turned on during the second charge sharing period CS2, the ramp signal RAMP may decrease (or increase) with a constant slope for a first image readout time SRT1.

The CDS circuit (see 150 of FIG. 1) may compare the ramp signal RAMP with the pixel signal PXS (i.e., the first reset voltage $SIG_L$) output through the column line CL for the first image readout time SRT1. Accordingly, the ADC circuit (see 140 of FIG. 1) may convert the first image voltage $SIG_L$ into a first image value that is a digital value.

After the second charge sharing period CS2 has elapsed and the second sampling control signal SPS2 transitions from a high level to a low level, the first and second precharge selection transistors PSX1 and PSX2 may be respectively turned on for a third precharge time PT3 in response to the high-level first and second precharge selection signals PSEL1 and PSEL2. The second node N2 may be precharged based on the first voltage indicating the reset level of the floating diffusion node FD.

In a third charge sharing period CS3, the third sampling transistor SMP3 may be turned on in response to the high-level third sampling signal SPS3. The second node N2 and the fifth node N5 may be connected to each other so that charge sharing occurs between the second node N2 and the fifth node N5. Accordingly, the second node N2 may be settled to the third voltage. The second driving transistor DX2 may generate the second image voltage $SIG_{LR}$ corresponding to the third voltage. The first selection transistor SX1 may output the second image voltage $SIG_{LR}$ to the column line CL.

After the third sampling transistor SMP3 is turned on during the third charge sharing period CS3, the ramp signal RAMP may decrease (or increase) with a constant slope for a second image readout time SRT2.

The CDS circuit (see 150 of FIG. 1) may compare the ramp signal RAMP with the pixel signal PXS (i.e., the second image voltage $SIG_{LR}$) output through the column line CL for the second image readout time SRT2. Accordingly, the ADC circuit (see 140 of FIG. 1) may convert the second image voltage $SIG_{LR}$ into a second image value that is a digital value.

Referring to FIGS. 7 and 9B, because the pixel PXb operates in the rolling shutter mode, the first selection signal SEL1, the first, second, and third sampling signals SPS1, SPS2, and SPS3, and the first precharge selection signal PSEL1 may be at a low level, and the first selection transistor SX1, the first, second, and third sampling transistors SMP1, SMP2 and SMP3, and the first precharge selection transistor PSX1 may be respectively turned off in response to the low-level first selection signal SEL1, the low-level first, second, and third sampling signals SPS1, SPS2, and SPS3, and the low-level first precharge selection signal PSEL1. The precharge signal PC and the second precharge selection signal PSEL2 may be at a high level, and the precharge transistor PXC and the second precharge selection transistor PSX2 may be respectively turned on in response to the high-level precharge signal PC and the high-level second precharge selection signal PSEL2.

Because the operation of the pixel PXb during a reset period RSTP and an integration period INTP are the same as described with reference to FIG. 9A, redundant descriptions thereof are omitted.

The second selection signal SEL2 may be at a high level during the readout period, and the second selection transistor SX2 may be turned on in response to the high-level second selection signal SEL2. The second selection transistor SX2 may output, to the column line CL, the pixel signal PXS output from the first driving transistor DX1.

The reset transistor RX may be turned on for a reset time RT in response to the high-level reset control signal RS, so that the floating diffusion node FD is reset. The first driving transistor DX1 may output the first voltage (e.g., the reset voltage RST) indicating the voltage level of the reset floating diffusion node FD. The second selection transistor SX2 may output the reset voltage RST to the column line CL.

The ramp signal RAMP may decrease (or increase) with a constant slope for a reset readout time RRT. The CDS circuit (see 150 of FIG. 1) may compare the ramp signal RAMP with the pixel signal PXS (i.e., the reset voltage RST) output through the column line CL for the reset readout time RRT. Accordingly, the ADC circuit (see 140 in FIG. 1) may convert the reset voltage RST into a reset value that is a digital value.

Thereafter, the first transfer control signal TS1 may transition from a low level to a high level. In a first transfer period TT1, the first transfer transistor TX1 may be turned on in response to the high-level first transfer control signal TS1, so that photocharges generated by the first photodiode PD for a first integration time IT1 are transferred to the floating diffusion node FD. Photocharges generated by the first photodiode PD1 may be integrated at the floating diffusion node FD, and the first driving transistor DX1 may output, to the first node N1, the second voltage (e.g., the first image voltage $SIG_L$) corresponding to the voltage level of the floating diffusion node FD at which the photocharges are integrated. The second selection transistor SX2 may output the first image voltage $SIG_L$ to the column line CL.

The ramp signal RAMP may decrease (or increase) with a constant slope for a first image readout time SRT1. The CDS circuit (see 150 of FIG. 1) may compare the ramp signal RAMP with the first image voltage $SIG_L$ output through the column line CL for the first image readout time SRT1. Accordingly, the ADC circuit (see 140 of FIG. 1) may convert the first image voltage $SIG_L$ into a first image value that is a digital value.

Thereafter, the first and second transfer control signals TS1 and TS2 may transition from a low level to a high level. In a second transfer period TT2, the second transfer transistor TX2 may be turned on in response to the high-level second transfer control signal TS2, so that photocharges generated by the second photodiode PD2 for a second integration time IT2 are transferred to the floating diffusion node FD. In addition, the first transfer transistor TX1 may be turned on in response to the high-level first transfer control signal TS1, so that photocharges remaining in the first photodiode PD and photocharges generated after the first transfer period TT1 are transferred to the floating diffusion node FD. Photocharges generated by the first photodiode PD1 and the second photodiode PD2 may be integrated at the floating diffusion node FD, and the first driving transistor DX1 may output, to the first node N1, the third voltage (e.g., the second image voltage) corresponding to the voltage level of the floating diffusion node FD at which the photocharges are integrated. The second selection transistor SX2 may output the second image voltage $SIG_{LR}$ to the column line CL.

The ramp signal RAMP may decrease (or increase) with a constant slope for a second image readout time SRT2. The CDS circuit (see 150 of FIG. 1) may compare the ramp signal RAMP with the second image voltage $SIG_{LR}$ output through the column line CL for the second image readout time SRT2. Accordingly, the ADC circuit (see 140 of FIG. 1) may convert the second image voltage $SIG_{LR}$ into a second image value that is a digital value.

Referring to FIGS. 9A and 9B, the pixel PXb may operate in the global shutter mode and the rolling shutter mode to output the reset voltage RST, the first image voltage $SIG_L$, and the second image voltage $SIG_{LR}$, and the ADC circuit (see 140 of FIG. 1) may perform ADC conversion thereon to generate the reset value, the first image value, and the second image value. A first signal value and a second signal value, from which noise is canceled, may be calculated by subtracting the reset value from the first image value and the second image value. The first signal value may indicate the light amount of the first light signal (see L1 of FIG. 8B) received by the pixel PXb, and the second signal value may indicate the light amount of the first light signal and the second light signal (see L2 of FIG. 8B) received by the pixel PXb.

The signal processor (see 190 of FIG. 1) of the image sensor (see 100 of FIG. 1) or the external processor may calculate a third signal value corresponding to the second light signal by subtracting the first signal value from the second signal value. The first signal value corresponding to the first light signal and the third signal value corresponding to the second light signal may be used as autofocus data. In addition, a plurality of second signal values corresponding to the pixels PX of the pixel array (see 110 of FIG. 1) may be generated as the image data (see IDTA of FIG. 1).

Figure 10:
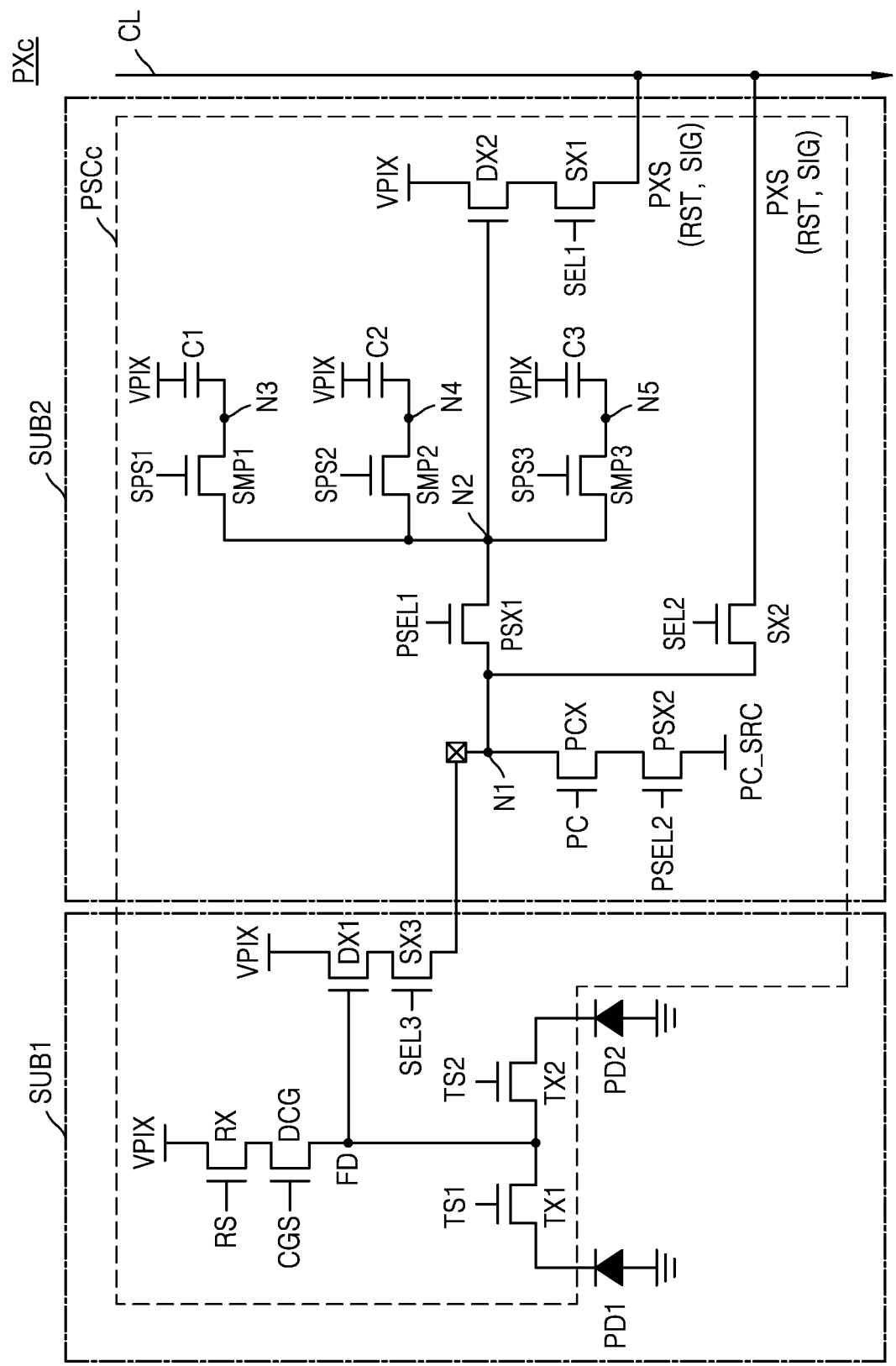
FIG. 10 is a circuit diagram illustrating a pixel according to an embodiment.

FIG. 10 is a circuit diagram illustrating a pixel PXc according to an embodiment.

Referring to FIG. 10, the pixel PXc may include a first photodiode PD1, a second photodiode PD2, and a pixel signal generation circuit PSCc. The pixel signal generation circuit PSCc may include a plurality of transistors, a first capacitor C1, a second capacitor C2, and a third capacitor C3. The transistors may include a first transfer transistor TX1, a second transfer transistor TX2, a reset transistor RX, a conversion gain control transistor DCG, a first driving transistor DX1, a first precharge selection transistor PSX1, a second precharge selection transistor PSX2, a precharge transistor PCX, a first sampling transistor SMP1, a second sampling transistor SMP2, a third sampling transistor SMP3, a second driving transistor DX2, a first selection transistor SX1, a second selection transistor SX2, a third selection transistor SX3. Control signals may be applied to the pixel signal generation circuit PSCc. The control signals may include a first transfer control signal TS1, a second transfer control signal TS2, a reset control signal RS, a gain control signal CGS, a first precharge selection signal PSEL1, a second precharge selection signal PSEL2, a precharge signal PC, a first sampling signal SPS1, a second sampling signal SPS2, a third sampling signal SPS3, a first selection signal SEL1, a second selection signal SEL2, and a third selection signal SEL3. At least some of the control signals may be generated by the row driver (see 120 of FIG. 1).

The pixel PXc of FIG. 10 is a modification of the pixel PXb of FIG. 7. Compared to the pixel PXb of FIG. 7, the pixel PXc may further include the third selection transistor SX3. A first terminal of the third selection transistor SX3 may be connected to a second terminal of the first driving transistor DX1, and a second terminal of the third selection transistor SX3 may be connected to a first node N1. The third selection transistor SX3 may be turned on or off in response to the third selection signal SEL3. The control signals TS1, TS2, RS, CGS, PSEL1, PSEL2, PC, SPS1, SPS2, SPS3, SEL1, and SEL2 provided to the pixel PXc may be the same as the control signals TS1, TS2, RS, CGS, PSEL1, PSEL2, PC, SPS1, SPS2, SPS3, SEL1, and SEL2 provided to the pixel PXb of FIG. 7. Accordingly, the operation of the pixel PXc may be similar to the operation of the pixel PXb of FIG. 7 described above with reference to FIGS. 9A and 9B.

The third selection signal SEL3 may be the same as the second precharge selection signal PSEL2 when the pixel PXc operates in the global shutter mode and the rolling shutter mode. In an embodiment, the third selection signal SEL3 may be at a high level during the global signal dumping period and the rolling readout period when the pixel PXc operates in the global shutter mode. Accordingly, the third selection transistor SX3 may be turned on during the global signal dumping period and the rolling readout period.

The image sensor (see 110 of FIG. 1) may be formed on a plurality of laminated substrates, and the pixels (see PX of FIG. 1) included in the pixel array (see 110 of FIG. 1) may be separately arranged on at least two substrates among the substrates. In an embodiment, the first and second photodiodes PD1 and PD2 of the pixel PXc and some transistors of the pixel signal generation circuit PSCC, for example, the first and second transfer transistors TX1 and TX2, the reset transistor RX, the conversion gain control transistor DCG, the third selection transistor SX3, and the first driving transistor DX1 may be formed on a first substrate SUB1. The remaining transistors of the pixel signal generation circuit PSCc, for example, the precharge transistor PCX, the first and second precharge selection transistors PSX1 and PSX2, the first, second, and third sampling transistors SMP1, SMP2, and SMP3, the second driving transistor DX2, the first and second selection transistors SX1 and SX2, and the first, second, and third capacitors C1, C2, and C3, may be formed on a second substrate SUB2. In an embodiment, the first substrate SUB1 may be disposed on the top of the substrates, and the second substrate SUB2 may be disposed in the middle of the substrates (e.g., below the first substrate SUB1).

Figure 11:
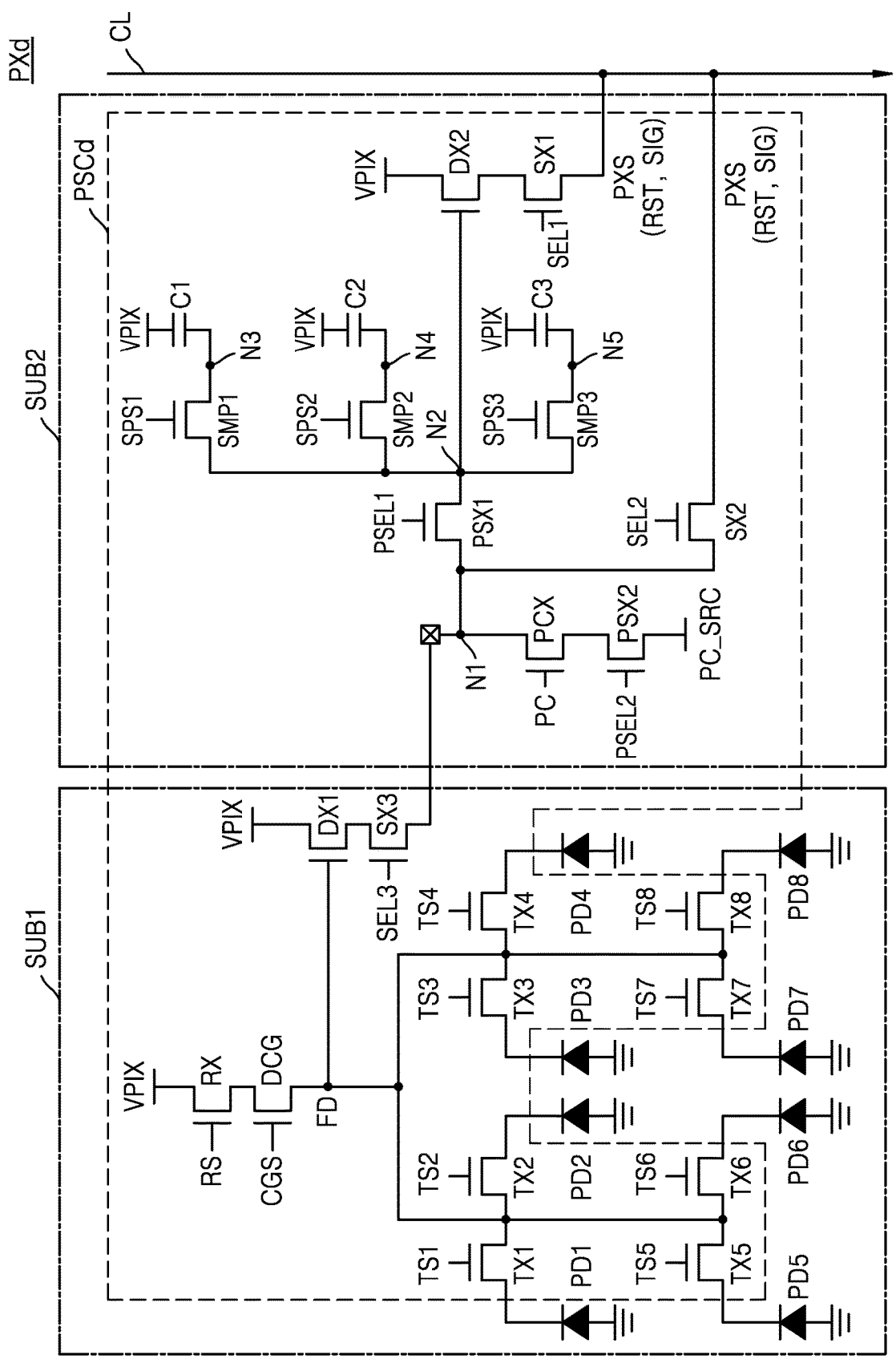
FIG. 11 is a circuit diagram illustrating a pixel according to an embodiment.

FIG. 11 is a circuit diagram illustrating a pixel PXd according to an embodiment.

Referring to FIG. 11, the pixel PXd may include a plurality of photodiodes and a pixel signal generation circuit PSCd. For example, the photodiodes may include a first photodiode PD1, a second photodiode PD2, a third photodiode PD3, a fourth photodiode PD4, a fifth photodiode PD5, a sixth photodiode PD6, a seventh photodiode PD7, and an eighth photodiode PD8. The pixel signal generation circuit PSCd may include a plurality of transistors, a first capacitor C1, a second capacitor C2, and a third capacitor C3. The transistors may include a first transfer transistor TX1, a second transfer transistor TX2, a third transfer transistor TX3, a fourth transfer transistor TX4, a fifth transfer transistor TX5, a sixth transfer transistor TX6, a seventh transfer transistor TX7, an eighth transfer transistor TX8, a reset transistor RX, a conversion gain control transistor DCG, a first driving transistor DX1, a first precharge selection transistor PSX1, a second precharge selection transistor PSX2, a precharge transistor PCX, a first sampling transistor SMP1, a second sampling transistor SMP2, a third sampling transistor SMP3, a second driving transistor DX2, a first selection transistor SX1, a second selection transistor SX2, a third selection transistor SX3. Control signals may be applied to the pixel signal generation circuit PSCd. The control signals may include a first transfer control signal TS1, a second transfer control signal TS2, a reset control signal RS, a gain control signal CGS, a first precharge selection signal PSEL1, a second precharge selection signal PSEL2, a precharge signal PC, a first sampling signal SPS1, a second sampling signal SPS2, a third sampling signal SPS3, a first selection signal SEL1, a second selection signal SEL2, and a third selection signal SEL3. At least some of the control signals may be generated by the row driver (see 120 of FIG. 1).

In an embodiment, the first to eighth photodiodes PD1 to PD8, the first to eighth transfer transistors TX1 to TX8 corresponding to the photodiodes PD1 to PD8, the reset transistor RX, the conversion gain control transistor DCG, the first driving transistor DX1, and the third selection transistor SX3 may be formed on a first substrate SUB1, and the first to third sampling transistors SMP1, SMP2, and SMP3, the precharge transistor PCX, the first and second precharge selection transistors PSX1 and PSX2, the second driving transistor DX2, the first and second selection transistors SX1 and SX2, and the first to third capacitors C1, C2, and C3 may be formed on a second substrate SUB2.

The first transfer transistor TX1 may be turned on or off in response to the first transfer control signal TS1. The second transfer transistor TX2 may be turned on or off in response to the second transfer control signal TS2. The third transfer transistor TX3 may be turned on or off in response to the third transfer control signal TS3. The fourth transfer transistor TX4 may be turned on or off in response to the fourth transfer control signal TS4. The fifth transfer transistor TX5 may be turned on or off in response to the fifth transfer control signal TS5. The sixth transfer transistor TX6 may be turned on or off in response to the sixth transfer control signal TS6. The seventh transfer transistor TX7 may be turned on or off in response to the seventh transfer control signal TS7. The eighth transfer transistor TX8 may be turned on or off in response to the eighth transfer control signal TS8.

Figure 12:
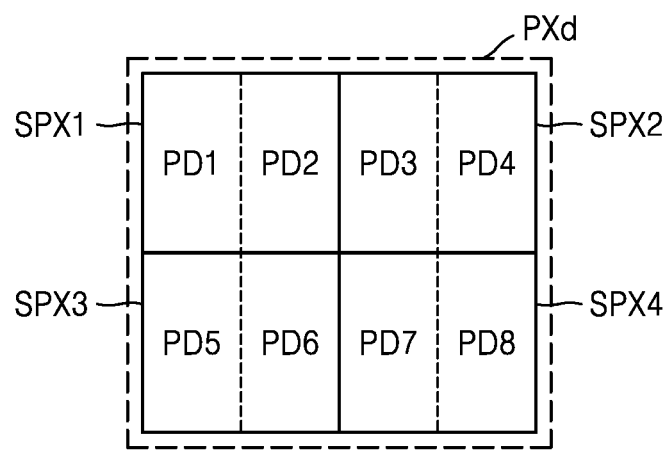
FIG. 12 is a plan view schematically illustrating the pixel of FIG. 11.

FIG. 12 is a plan view schematically illustrating the pixel PXd of FIG. 11.

Referring to FIGS. 11 and 12, one pair of photodiodes and one pair of transfer transistors corresponding to the pair of photodiodes may be referred to as a sub-pixel. For example, the first and second photodiodes PD1 and PD2 and the first and second transfer transistors TX1 and TX2 may constitute a first sub-pixel SPX1. The third and fourth photodiodes PD3 and PD4 and the third and fourth transfer transistors TX3 and TX4 may constitute a second sub-pixel SPX2. The fifth and sixth photodiodes PD5 and PD6 and the fifth and sixth transfer transistors TX5 and TX6 may constitute a third sub-pixel SPX3. The seventh and eighth photodiodes PD7 and PD8 and the seventh and eighth transfer transistors TX7 and TX8 may constitute a fourth sub-pixel SPX4. The sub-pixels SPX1, SPX2, SPX3, and SPX4 may share the floating diffusion node FD and the pixel signal generation circuit PSCd with each other. A color filter and a microlens may be stacked on each of the sub-pixels SPX1, SPX2, SPX3, and SPX4. In an embodiment, the sub-pixels SPX1, SPX2, SPX3, and SPX4 may sense light signals of the same color. For example, the sub-pixels SPX1, SPX2, SPX3, and SPX4 may include color filters of the same color (e.g., color filters that transmit light signals of the same color).

On the other hand, FIGS. 11 and 12 illustrate that the pixel PXd includes four sub-pixels, but aspects of the inventive concept are not limited thereto. The pixel PXd may include two or more sub-pixels.

Referring to FIG. 11, according to the operation mode of the pixel array (see 110 of FIG. 1), pixel signals SPX respectively corresponding to the sub-pixels SPX1, SPX2, SPX3, and SPX4 may be output through the column line CL and converted into pixel values, or a pixel signal SPX common to the sub-pixels SPX1, SPX2, SPX3, and SPX4 may be output through the column line CL and converted into a pixel value.

When the pixel array (see 110 of FIG. 1) operates in a binning mode, the pixel PXd may perform shuttering in accordance with the global shutter method in a manner similar to that described above with reference to FIG. 9A. For example, the pixel PXd may operate in the global shutter mode. The third transfer control signal TS3, the fifth transfer control signal TS5, and the seventh transfer control signal TS7 may be the same as the first transfer control signal TS1. The fourth transfer control signal TS4, the sixth transfer control signal TS6, and the eighth transfer control signal TS8 may be the same as the second transfer control signal TS2.

In the first transfer period (see TT1 of FIG. 9A), the first, third, fifth, and seventh transfer transistors TX1, TX3, TX5, and TX7 may be turned on so that photocharges generated and integrated by the first, third, fifth, and seventh photodiodes PD1, PD3, PD5, and PD7 are transferred to the floating diffusion node FD. In the second transfer period (see TT2 of FIG. 9A), the second, fourth, sixth, and eighth transfer transistors TX2, TX4, TX6, and TX8 may be turned on so that photocharges generated and integrated by the second, fourth, sixth, and eighth photodiodes PD2, PD4, PD6, and PD8 are transferred to the floating diffusion node FD. In addition, in the second transfer period TT2, the first, third, fifth, and seventh transfer transistors TX1, TX3, TX5, and TX7 may be turned on so that photocharges remaining in the first, third, fifth, and seventh photodiodes PD1, PD3, PD5, and PD7 and photocharges generated and integrated after the first transfer period TT1 are transferred to the floating diffusion node FD.

Accordingly, a voltage corresponding to photocharges generated and integrated by the photodiodes of one of the sub-pixels SPX1, SPX2, SPX3, and SPX4, for example, the first, third, fifth, and seventh photodiodes PD1, PD3, PD5, and PD7 may be generated as the first image voltage $SIG_L$, and a voltage corresponding to photocharges generated and integrated by the first to eighth photodiodes PD1 to PD8 may be generated as the second image voltage $SIG_{LR}$.

As such, because the sub-pixels SPX1, SPX2, SPX3, and SPX4 operate in the same manner in the binning mode, the pixel PXd may generate the pixel signal PXS common to the sub-pixels SPX1, SPX2, SPX3, and SPX4. For example, one pixel value may be generated for the pixel PXd.

When the pixel array (see 110 of FIG. 1) operates in a full mode, the pixels PXd may perform shuttering in accordance with the rolling shutter method in a manner similar to that described above with reference to FIG. 9B. For example, the pixel PXd may operate in the rolling shutter mode.

The first transfer control signal TS1, the third transfer control signal TS3, the fifth transfer control signal TS5, and the seventh transfer control signal TS7 may be different from each other, and the second transfer control signal TS2, the fourth transfer control signal TS4, the sixth transfer control signal TS6, and the eighth transfer control signal TS8 may be different from each other. Accordingly, the sub-pixels SPX1, SPX2, SPX3, and SPX4 may sequentially operate like pixels located in different rows of the pixel array 110. The pixel signals PSX respectively corresponding to the sub-pixels SPX1, SPX2, SPX3, and SPX4 may be sequentially output through the column line CL. As such, because the sub-pixels SPX1, SPX2, SPX3, and SPX4 operate sequentially in the full mode, the pixel PXd may generate the pixel signals PXS respectively corresponding to the sub-pixels SPX1, SPX2, SPX3, and SPX4. The pixel values may be generated for the pixel PXd. Accordingly, the image sensor (see 100 of FIG. 1) may generate high-resolution image data IDTA.

Figure 13:
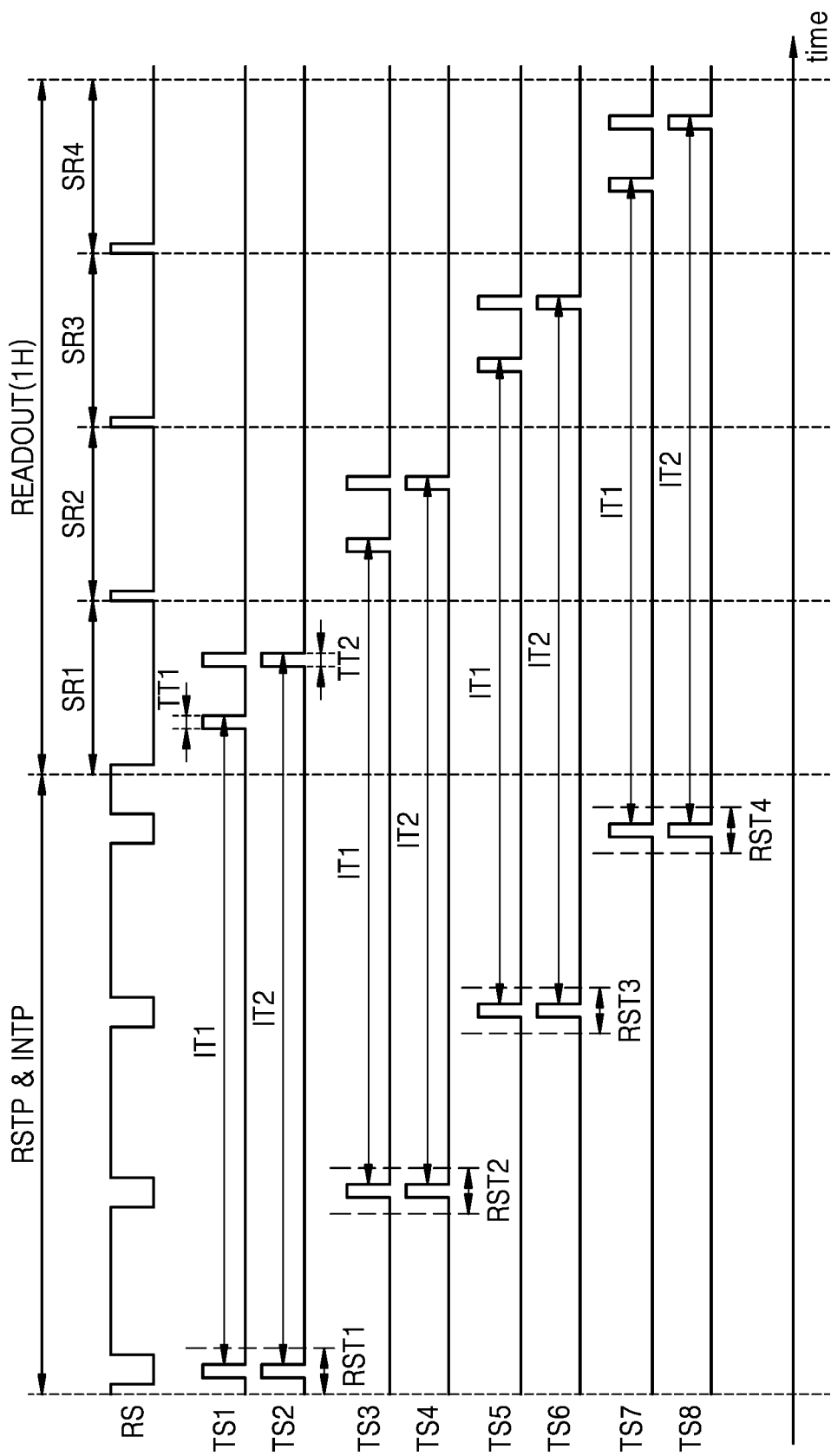
FIG. 13 is a timing diagram illustrating control signals provided to a pixel, according to an embodiment.

FIG. 13 is a timing diagram illustrating control signals provided to a pixel, according to an embodiment.

FIG. 13 illustrates the reset control signal RS and the first to eighth transfer control signals TS1 to TS8 provided to the pixel PXd of FIG. 11 when the pixel PXd operates in the rolling shutter mode.

The other control signals, for example, the gain control signal CGS, the first to third sampling signals SPS1, SPS2, and SPS3, the first and second precharge selection signals PSEL1 and PSEL2, the precharge signal PC, and the first and second selection signals SEL1 and SEL2 may be the same as the gain control signal CGS, the first to third sampling signals SPS1, SPS2, and SPS3, the first and second precharge selection signals PSEL1 and PSEL2, the precharge signal PC, and the first and second selection signals SEL1 and SEL2, which are described above with reference to FIG. 9. The third selection signal SEL3 may be the same as the second selection signal SEL2.

Referring to FIGS. 11 and 13, the transfer control signals provided to the first to fourth sub-pixels SPX1, SPX2, SPX3, and SPX4 during a reset period and integration period RSTP & INTP, for example, the first and second transfer control signals TS1 and TS2, the third and fourth transfer control signals TS3 and TS4, the fifth and sixth transfer control signals TS5 and TS6, and the seventh and eighth transfer control signals TS7 and TS8, may toggle sequentially, so that the photodiodes provided in the first to fourth sub-pixels SPX1, SPX2, SPX3, and SPX4 are sequentially reset. For example, the first and second photodiodes PD1 and PD2 may be reset during a first reset period RST1. After a certain time, the third and fourth photodiodes PD3 and PD4 may be reset during a second reset period RST2. After a certain time, the fifth and sixth photodiodes PD5 and PD6 may be reset during a third reset period RST3. After a certain time, the seventh and eighth photodiodes PD7 and PD8 may be reset during a fourth reset period RST4. The certain time may be determined based on the duration of the sub-readout period of the readout period, for example, a first sub-readout period SR1.

After the first to eighth photodiodes PD1 to PD8 are reset, the first to eighth photodiodes PD1 to PD8 may generate and integrate photocharges according to the received light signal.

The readout period (for example, one horizontal period) may include a plurality of sub-readout periods SR1, SR2, SR3, and SR4. The first sub-pixel SPX1 may be read out during the first sub-readout period SR1. The second sub-pixel SPX2 may be read out during the second sub-readout period SR2. The third sub-pixel SPX3 may be read out during the third sub-readout period SR3. The fourth sub-pixel SPX4 may be read out during the fourth sub-readout period SR3.

After the first photodiode PD1 and the second photodiode PD2 are reset, photocharges may be generated and integrated by the first photodiode PD1 for a first integration time IT1 and photocharges may be generated and integrated by the second photodiode PD2 for a second integration time IT2.

The first transfer control signal TS1 may be at a high level during a first transfer period TT1 of the first sub-readout period SR1. The first transfer transistor TX1 may be turned on in response to the high-level first transfer control signal TS1, so that photocharges integrated at the first photodiode PD1 are transferred to the floating diffusion node FD. The first and second transfer control signals TS1 and TS2 may be at a high level during a second transfer period TT2. The first and second transfer transistors TX1 and TX2 may be respectively turned on in response to the high-level first and second transfer control signals TS1 and TS2, so that photocharges integrated at the first and second photodiodes PD1 and PD2 are transferred to the floating diffusion node FD.

Before the first transfer period TT1, the reset voltage corresponding to the voltage level of the reset floating diffusion node FD output from the first driving transistor DX1 may be output to the column line CL through the second selection transistor SX2. After the first transfer period TT1 and before the second transfer period TT2, the first image voltage output from the first driving transistor DX1 may be output to the column line CL through the second selection transistor SX2. The first image voltage may correspond to photocharges generated and integrated by the first photodiode PD1. After the second transfer period TT2, the second image voltage output from the first driving transistor DX1 may be output to the column line CL through the second selection transistor SX2. The second image voltage may correspond to photocharges generated and integrated by the first photodiode PD1 and the second photodiode PD2. Accordingly, the reset voltage, the first image voltage, and the second image voltage corresponding to the first sub-pixel SPX1 may be sequentially output through the column line CL.

In the second, third, and fourth sub-readout periods SR2, SR3, and SR4, the third to eighth transfer control signals TS3 to TS8 may be similar to the first and second transfer control signals TS1 and TS2 of the first sub-readout period SR1. Accordingly, the reset voltage, the first image voltage, and the second image voltage corresponding to each of the second, third, and fourth sub-pixels SPX2, SPX3, and SPX4 may be sequentially output through the column line CL.

The processor (see 190 of FIG. 1) (or the external processor) may generate a binocular parallax signal for each of the sub-pixels, for example, the first to fourth sub-pixels SPX1 to SPX4, based on the first image voltage and the second image voltage. In addition, the processor 190 may generate pixel values constituting the image data IDTA for two photodiodes of each of the first to fourth sub-pixels SPX1 to SPX4 of the pixel PXd. Accordingly, the high-resolution image data IDTA may be generated.

Figure 14:
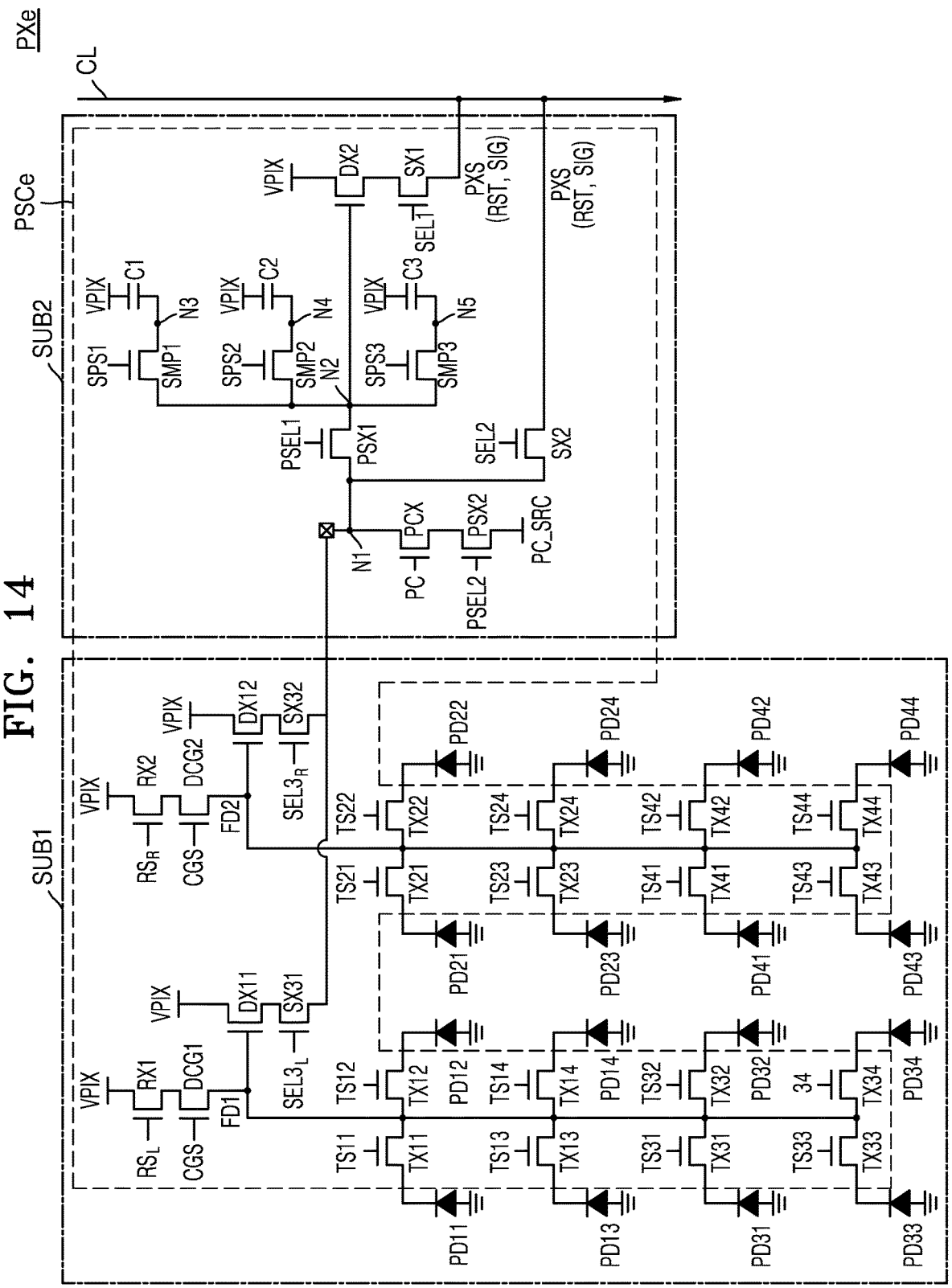
FIG. 14 is a circuit diagram illustrating a pixel according to an embodiment.
Figure 15:
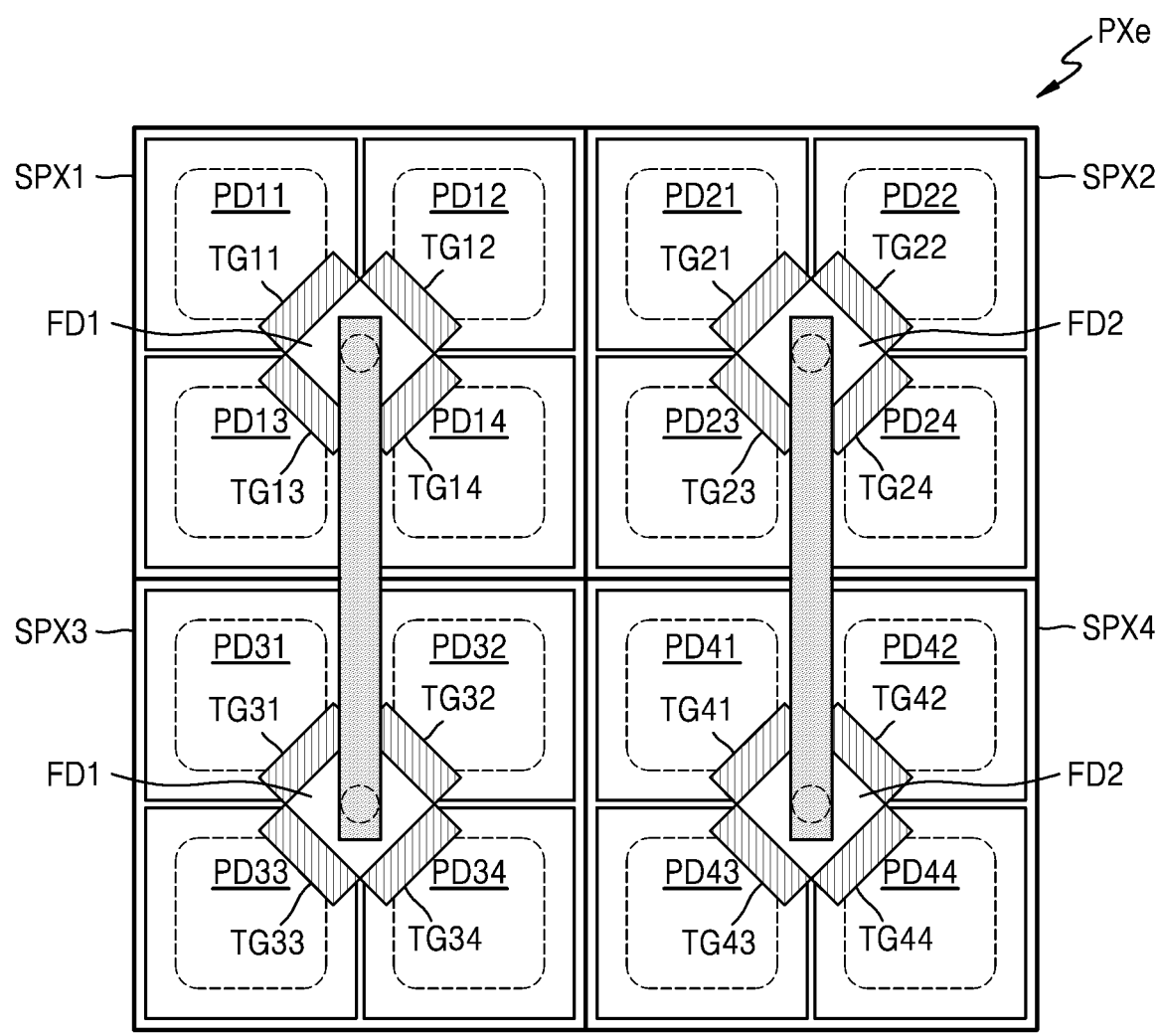
FIG. 15 is a plan view schematically illustrating the pixel of FIG. 14.

FIG. 14 is a circuit diagram illustrating a pixel PXe according to an embodiment, and FIG. 15 is a plan view schematically illustrating the pixel PXe of FIG. 14.

Referring to FIG. 14, the pixel PXe may include a plurality of photodiodes PD11 to PD14, PD21 to PD24, PD31 to PD34, and PD41 to PD44 and a pixel signal generation circuit PSCe. The pixel signal generation circuit PSCe may include a plurality of transistors, a first capacitor C1, a second capacitor C2, and a third capacitor C3. The transistors may include first transfer transistors TX11 to TX14, second transfer transistors TX21 to TX24, third transfer transistors TX31 to TX34, fourth transfer transistors TX41 to TX44, a first reset transistor RX1, a first conversion gain control transistor DCG1, a second reset transistor RX2, a second conversion gain control transistor DCG2, first driving transistors DX11 and DX12, first and second precharge selection transistors PSX1 and PSX2, a precharge transistor PCX, first to third sampling transistors SMP1, SMP2, and SMP3, a second driving transistor DX2, first and second selection transistors SX1 and SX2, and third selection transistors SX31 and SX32. Control signals may be applied to the pixel signal generation circuit PSCe. The control signals may include first transfer control signals TS11 to TS14, second transfer control signals TS21 to TS24, third transfer control signals TS31 to TS34, fourth transfer control signals TS41 to TS44, reset control signals RSL and RSR, a gain control signal CGS, first and second precharge selection signals PSEL1 and PSEL2, a precharge signal PC, first to third sampling signals SPS1, SPS2, and SPS3, selection signals SEL1, SEL2, SEL3$_L$, and SEL3$_R$. The control signals may be generated by the row driver (see 120 of FIG. 1).

In an embodiment, the photodiodes PD11 to PD14, PD21 to PD24, PD31 to PD34, and PD41 to PD44, the transfer transistors TX11 to TX14, TX21 to TX24, TX31 to TX34, and TX41 to TX44 corresponding to the photodiodes PD11 to PD14, PD21 to PD24, PD31 to PD34, and PD41 to PD44, the reset transistors RX1 and RX2, the conversion gain control transistors DCG1 and DCG2, the first driving transistors DX11 and DX12, and the third selection transistors SX31 and SX32 may be formed on a first substrate SUB1. The first to third sampling transistors SMP1, SMP2, and SMP3, the precharge transistor PCX, the first and second precharge selection transistors PSX1 and PSX2, the second driving transistor DX2, the first and second selection transistors SX1 and SX2, and the first to third capacitors C1, C2 and C3 may be formed on a second substrate SUB2.

Referring to FIGS. 14 and 15, the four first photodiodes PD11 to PD14 and the four first transfer transistors TX11 to TX14 respectively connected thereto may constitute a first sub-pixel SPX1. The four second photodiodes PD21 to PD24 and the four second transfer transistors TX21 to TX24 respectively connected thereto may constitute a second sub-pixel SPX2. The four third photodiodes PD31 to PD34 and the four third transfer transistors TX31 to TX34 respectively connected thereto may constitute a third sub-pixel SPX3. The four fourth photodiodes PD41 to PD44 and the four fourth transfer transistors TX41 to TX44 respectively connected thereto may constitute a fourth sub-pixel SPX4.

A microlens may be stacked on each of the first to fourth sub-pixels SPX1, SPX2, SPX3, and SPX4. For example, the four first photodiodes PD11 to PD14 may receive light signals received through the same microlens. Color filters may be disposed between the photodiodes and the microlens. The color filters provided in the first to fourth sub-pixels SPX1, SPX2, SPX3, and SPX4 may transmit light signals of the same color.

In FIG. 15, first transfer gates TG11 to TG14 may be gate terminals of the first transfer transistors TX11 to TX14, respectively. Second transfer gates TG21 to TG24 may be gate terminals of the second transfer transistors TX21 to TX24, respectively. Third transfer gates TG31 to TG34 may be gate terminals of the third transfer transistors TX31 to TX34, respectively. Fourth transfer gates TG41 to TG44 may be gate terminals of the fourth transfer transistors TX41 to TX44, respectively. The transfer gates may be connected to the corresponding photodiodes and the corresponding floating diffusion nodes. For example, the first transfer gate TG11 may be connected to the first photodiode PD1 and the first floating diffusion node.

The floating diffusion node of the first sub-pixel SPX1 and the floating diffusion node of the third sub-pixel SPX3 may be electrically connected to each other and may be referred to as the first floating diffusion node. The floating diffusion node of the second sub-pixel SPX2 and the floating diffusion node of the fourth sub-pixel SPX4 may be electrically connected to each other and may be referred to as the second floating diffusion node. For example, the floating diffusion nodes of the sub-pixels may be electrically connected to each other through vias and metal wires.

The first and third sub-pixels SPX1 and SPX3 may share the reset transistor RX1, the conversion gain control transistor DCG1, the first driving transistor DX11, and the third selection transistor SX31 with each other (hereinafter, the reset transistor RX1, the conversion gain control transistor DCG1, the first driving transistor DX11, and the third selection transistor SX31 are referred to as a first sub-pixel circuit). The second and fourth sub-pixels SPX2 and SPX4 may share the reset transistor RX2, the conversion gain control transistor DCG2, the first driving transistor DX12, and the third selection transistor SX32 with each other (hereinafter, the reset transistor RX2, the conversion gain control transistor DCG2, the first driving transistor DX12, and the third selection transistor SX32 are referred to as a second sub-pixel circuit).

The operation of each of the first sub-pixel circuit and the second sub-pixel circuit may be the same as or similar to the operations of the reset transistor RX, the conversion gain control transistor DCG, the first driving transistor DX1, and the third selection transistor SX3 of the pixel PXd of FIG. 11. The structure and operation of the circuit from the first node N1 to the column line CL in the pixel signal generation circuit PSCe may be the same as the structure and operation of the circuit from the first node N1 to the column line CL in the pixel signal generation circuit PSCd of FIG. 13.

The transfer transistors TX11 to TX14, TX21 to TX24, TX31 to TX34, and TX41 to TX44 may be turned on or off in response to the corresponding transfer control signal among the transfer control signals TS11 to TS14, TS21 to TS24, TS31 to TS34, and TS41 to TS44. The transfer transistors TX11 to TX14, TX21 to TX24, TX31 to TX34, and TX41 to TX44 may be turned on, and thus, charges integrated at corresponding photodiodes may be transferred to the floating diffusion nodes. For example, the first transfer transistor TX11 may be turned on in response to the first transfer control signal TS11 having an active level, and thus, charges integrated at the first photodiode PD11 may be transferred to the first floating diffusion node FD1.

The first driving transistor DX11 may generate a voltage corresponding to the voltage of the first floating diffusion node FD1. When the third selection transistor SX31 is in a turned-on state, the third selection transistor SX31 may output the generated voltage to the first node N1. The first driving transistor DX12 may generate a voltage corresponding to the voltage of the second floating diffusion node FD2. When the third selection transistor SX31 is in a turned-on state, the third selection transistor SX31 may output the generated voltage to the first node N1.

When the pixel array (see 110 of FIG. 1) operates in a binning mode, the pixel PXe may perform shuttering according to the global shutter method in a manner similar to that described above with reference to FIG. 9A. For example, the pixel PXe may operate in the global shutter mode. The first and third transfer control signals TS11 to TS14 and TS31 to TS34 may be the same as the first transfer control signal TS1 of FIG. 9A, and the second and fourth transfer control signals TS21 to TS24 and TS41 to TS44 may be the same as the second transfer control signal TS2 of FIG. 9A.

Accordingly, a voltage corresponding to photocharges generated and integrated by the first and third sub-pixels SPX1 and SPX3 may be generated as a first image voltage $SIG_L$, and a voltage corresponding to photocharges generated and integrated by the second and fourth sub-pixels SPX2 and SPX4 may be generated as a second image voltage $SIG_{LR}$.

When the pixel array (see 110 of FIG. 1) operates in a full mode, the pixel PXe may perform shuttering according to the rolling shutter method in a manner similar to that described above with reference to FIG. 13. For example, the pixel PXe may operate in the rolling shutter mode.

The transfer control signals TS11 to TS14, TS21 to TS24, TS31 to TS34, and TS41 to TS44 may be different from each other. The transfer transistors TX11 to TX14, TX21 to TX24, TX31 to TX34, and TX41 to TX44 may be sequentially turned on during the reset period and integration period RSTP & INTP, so that the photodiodes PD11 to PD14, PD21 to PD24, PD31 to PD34, and PD41 to PD44 are sequentially reset. In addition, the readout period may have a plurality of sub-readout periods, for example, 16 sub-readout periods. During the 16 sub-readout periods, the reset voltages and the image voltages corresponding to photocharges generated by the photodiodes PD11 to PD14, PD21 to PD24, PD31 to PD34, and PD41 to PD44 may be sequentially output through the column line CL. Accordingly, pixel values respectively corresponding to the photodiodes PD11 to PD14, PD21 to PD24, PD31 to PD34, and PD41 to PD44 may be generated.

In an embodiment, similar to that described above with reference to FIG. 13, one pair of transfer control signals may be the same as each other. In the reset period and integration period RSTP & INTP, one pair of photodiodes may be simultaneously reset. In one sub-readout period, the reset signal, the first image voltage corresponding to photocharges generated by one of the pair of photodiodes, and the second image voltage corresponding to photocharges generated by the pair of photodiodes may be sequentially output through the column line CL.

For example, one pair of control signals TS11 and TS12 may be the same as each other. In the reset period and integration period RSTP & INTP, one pair of transfer transistors TX11 and TX12 may be simultaneously turned on in response to one pair of transfer control signals TS11 and TS12, so that one pair of photodiodes PD11 and PD12 are simultaneously reset. In the first sub-readout period SR1, the reset voltage, the first image voltage corresponding to photocharges generated by the photodiode PD11, and the second image voltage corresponding to photocharges generated by the photodiodes PD11 and PD12 may be sequentially output through the column line CL. Similarly, image voltages corresponding to charges generated by the other photodiodes PD13, PD14, PD21 to PD24, PD31 to PD34, and PD41 to PD44 may be sequentially output through the column line CL.

A binocular parallax signal may be generated based on the reset voltage, the first image voltage, and the second image voltage, which are generated to correspond to each pair of photodiodes. In addition, pixel values corresponding to two photodiodes may be generated based on the reset voltage, the first image voltage, and the second image voltage, which are generated to correspond to each pair of photodiodes. Accordingly, pixel values respectively corresponding to the photodiodes PD11 to PD14, PD21 to PD24, PD31 to PD34, and PD41 to PD44 may be generated.

Figure 16A:
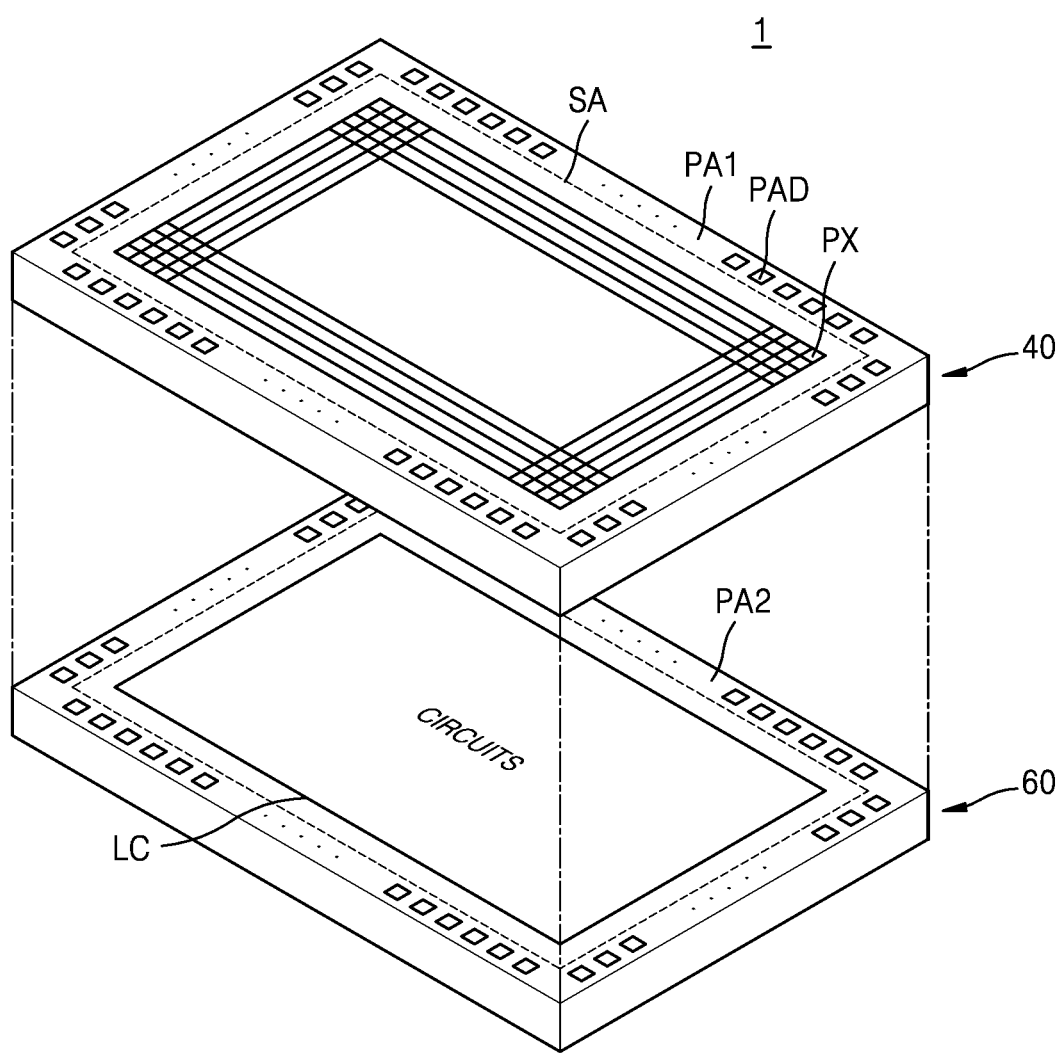
FIGS. 16A and 16B respectively illustrate stack structures of image sensors, according to an embodiment.
Figure 16B:
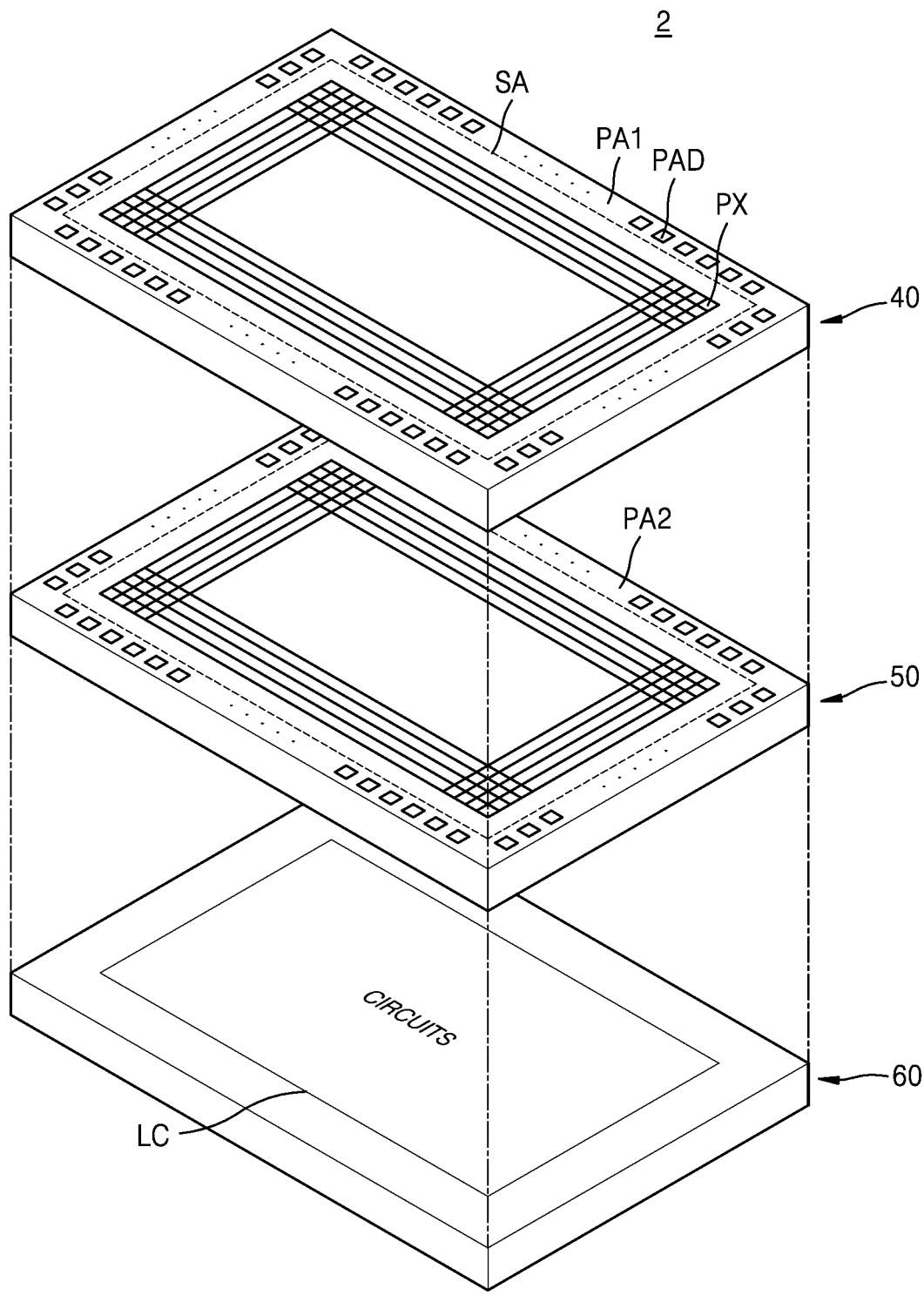

FIGS. 16A and 16B respectively illustrate stack structures of image sensors, according to an embodiment.

Referring to FIG. 16A, the image sensor 1 may include an upper chip 40 and a lower chip 60. The upper chip 40 may include a sensing area SA in which a plurality of pixels PX and in which elements that drive the pixels PX are provided. The upper chip 40 may also include a pad area PA around the sensing area SA. A plurality of upper pads PAD may be in the pad area PA. The upper pads PAD may be connected through vias to the elements provided in the lower chip 60 through vias.

The lower chip 60 may include a circuit area LC. Peripheral circuits of the pixel array (see 110 of FIG. 1), for example, the row driver (see 120 of FIG. 1), the ADC circuit (see 140 of FIG. 1), the ramp signal generator (see 130 of FIG. 1), the timing controller (see 180 of FIG. 1), and the signal processor (see 190 of FIG. 1) may be formed in the circuit area LC. In an embodiment, although not illustrated, the lower chip 60 may include a memory area and a dummy area. Memory elements, such as dynamic random access memory (DRAM) elements or static random access memory (SRAM) elements, may be arranged the memory area. However, the memory elements arranged in the memory area are not limited to the DRAM elements or the SRAM elements. The dummy area may have a function of supporting the upper chip 40 rather than a function of storing data.

Referring to FIG. 16B, the image sensor 2 may include a plurality of stacked chips. For example, pixel arrays 110 may be formed on an upper chip 40 and an intermediate chip 50, and memories or peripheral circuits of the pixel arrays 110 may be formed in a lower chip 60. As described above with reference to FIG. 10, the first and second photodiodes PD1 and PD2 and some transistors in the pixel PXc may be formed in the upper chip 40, and the remaining transistors and the capacitors C1, C2, and C3 may be formed in the intermediate chip 50.

The lower chip 60 may include a circuit area LC, and peripheral circuits of the pixel arrays (see 110 of FIG. 1) may be formed in the circuit area LC. In an embodiment, although not illustrated, the lower chip 60 may include a memory area and a dummy area.

In an embodiment, the upper chip 40 and the intermediate chip 50 may be stacked at a wafer level, and the lower chip 60 may be attached to the lower portion of the intermediate chip 50 at a chip level.

Figure 17A:
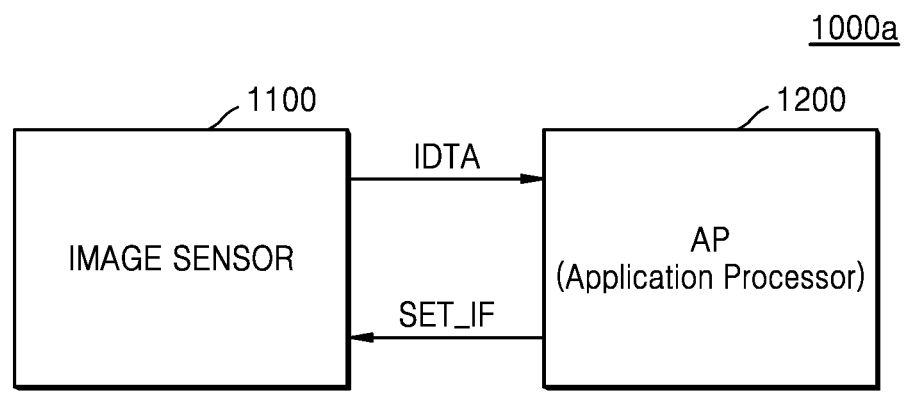
FIGS. 17A and 17B are respectively block diagrams illustrating electronic devices according to an embodiment.
Figure 17B:
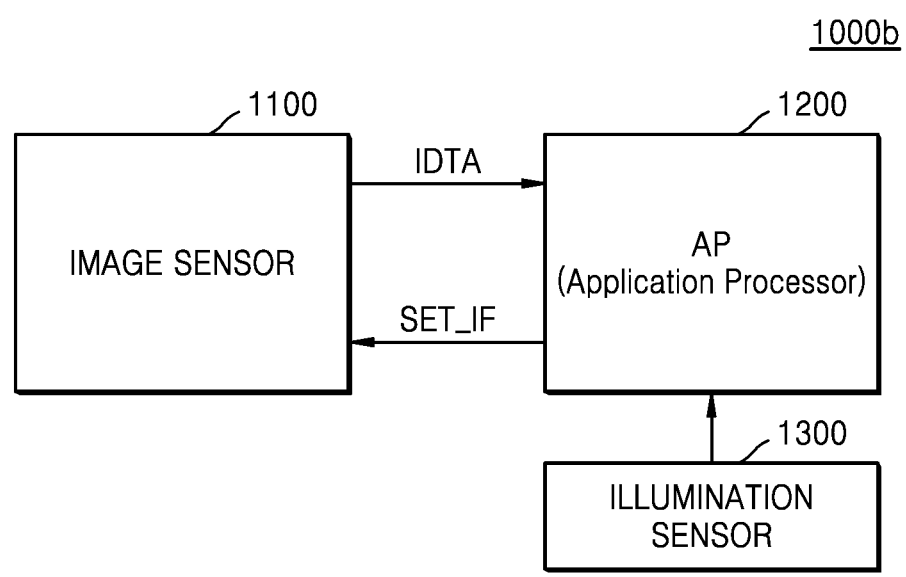

FIGS. 17A and 17B are respectively block diagrams schematically illustrating electronic devices 1000a and 1000b each including an image sensor, according to embodiments.

Referring to FIGS. 17A and 17B, the electronic devices 1000a and 1000b may each include an image sensor 1100 and an application processor (AP) 1200.

The AP 1200 may transmit, to the image sensor 1000, control signals for controlling the operation of the image sensor 1100. The control signals may include, for example, setting information SET IF for setting an operation mode, a shuttering mode, a conversion gain mode, and the like of the image sensor 1100. The transmission of the control signals may be performed based on, for example, an interface based on inter-integrated circuit (I2C). The control signals may further include configuration data of the image sensor 1100, such as a lens shading correction value, a crosstalk coefficient, an analog gain, a digital gain, a frame rate setting value, and the like.

The image sensor 1100 may generate image data IDTA by capturing an image of an object based on the received control signals. The image data IDTA may include still images and moving images. The image sensor 1100 may perform signal processing, such as image quality compensation, binning, and downsizing, on the image data IDTA. The image quality compensation may include, for example, signal processing such as black level compensation, lens shading compensation, crosstalk compensation, and bad pixel compensation.

The image sensors 100, 1, and 2 described above with reference to FIGS. 1 to 16B may be applied as the image sensor 1100. The pixel array (see 110 of FIG. 1) of the image sensor 1100 may operate in a global shutter mode or a rolling shutter mode. In addition, the pixel array 110 may operate in a high conversion gain mode, a low conversion gain mode, or a dual conversion gain mode. In an embodiment, at least some pixels of the pixel array 110 may be focus pixels that generate autofocus data. The focus pixels may include a pair of photodiodes.

In an embodiment, the pixels of the pixel array 110 may each include a plurality of sub-pixels. The sub-pixels may each include at least one pair of photodiodes and at least one pair of transfer transistors connected to the at least one pair of photodiodes. In an embodiment, the pixel may include four sub-pixels. The four sub-pixels may each include four photodiodes and four transfer transistors. The two sub-pixels may share a sub-pixel circuit with each other. The pixel array 110 may operate in the binning mode or the full mode. When the pixel array 110 operates in the binning mode, the pixel array 110 may perform shuttering according to the global shutter method. When the pixel array 110 operates in the full mode, the pixel array 110 may perform shuttering according to the rolling shutter method.

The image sensor 1100 may transmit the image data IDTA or the signal-processed image data IDTA to the AP 1200.

The transmission of the image data IDTA may be performed by using, for example, a camera serial interface (CSI) based on mobile industry processor interface (MIPI), but embodiments are not limited thereto.

The AP 1200 may perform, on the received image data IDTA, image processing such as bad pixel correction, 3A control (auto-focus correction, auto-white balance, and auto-exposure), noise reduction, sharpening, gamma control, remosaicing, demosaicing, or resolution scaling (video/preview).

In addition, the AP 1200 may generate a high dynamic range (HDR) image by performing HDR processing on a plurality of pieces of image data IDTA having different luminance.

Referring to FIG. 17B, the electronic device 1000b may further include an illumination sensor 1300. The illumination sensor 1300 may sense ambient illuminance of the electronic device 1000b and transmit information about the ambient illuminance to the AP 1200.

The AP 1200 may determine the operating mode, the shuttering mode, or the conversion gain mode of the image sensor 1100 based on the information about the ambient illumination. For example, when the illuminance is less than a reference value, the AP 1200 may determine the image sensor 1100 to operate in the global shutter mode, and when the illuminance is greater than or equal to the reference value, the AP 1200 may determine the image sensor 1100 to operate in the rolling shutter mode. For example, when the illuminance is less than the reference value, the AP 1200 may determine the image sensor 1100 to operate in the binning mode, and when the illuminance is greater than or equal to the reference value, the AP 1200 may determine the image sensor 1100 to operate in the full mode.

Figure 18:
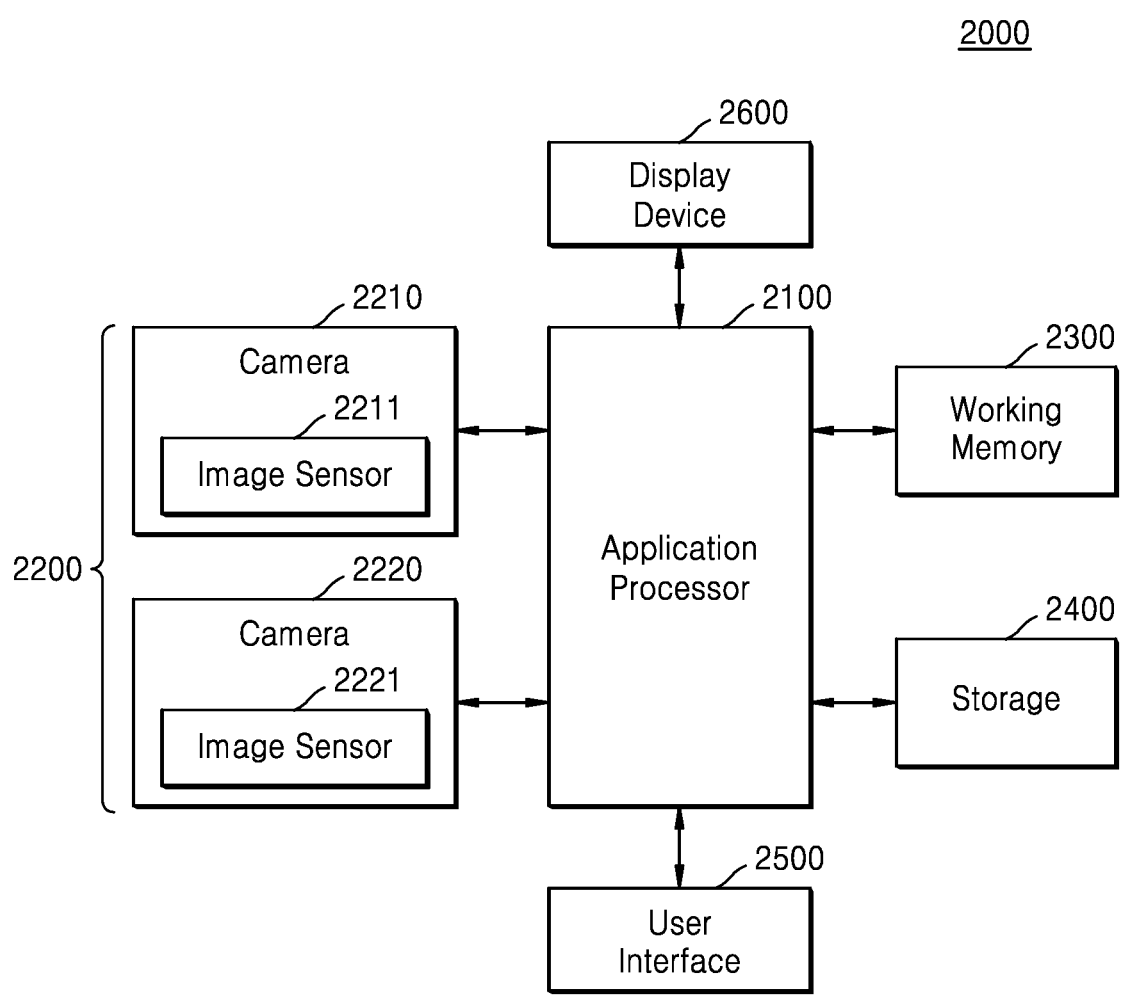
FIG. 18 is a block diagram schematically illustrating an electronic device including an image sensor, according to an embodiment.

FIG. 18 is a block diagram illustrating an electronic device 2000 including an image sensor, according to an embodiment. The electronic device 2000 of FIG. 18 may be a portable terminal.

Referring to FIG. 18, the electronic device 2000 may include an AP 2100, a camera module 2200, a display device 2600, a working memory 2300, a storage 2400, and a user interface 2500. The electronic device 2000 may further include other general-purpose components, for example, a communication module and a sensor module.

The AP 2100 may be implemented as a system-on-chip (SoC) that controls overall operations of the electronic device 2000 and drives application programs and an operating system. The AP 2100 may provide, to the display device 2600, the image data received from the camera module 2200, or may store the image data in the storage 2400. In an embodiment, the AP 2100 may include an image processing circuit and may perform image processing, such as image quality adjustment, data format change, and HDR processing, on the image data received from the camera module 2200.

The camera module 2200 may include a plurality of cameras, for example, a first camera 2210 and a second camera 2220. The first camera 2210 may include an image sensor 2211, and the second camera 2220 may include an image sensor 2221. At least one of the first image sensor 2211 and the second image sensor 2221 may be implemented as the image sensors 100, 1, and 2 described above with reference to FIGS. 1 to 16B. At least one of the first image sensor 2211 and the second image sensor 2221 may selectively perform shuttering according to the rolling shutter method (the rolling shutter mode) or the global shutter method (the global shutter mode). At least one of the first image sensor 2211 and the second image sensor 2221 may operate in the binning mode or the full mode. When operating in the binning mode, at least one of the first image sensor 2211 and the second image sensor 2221 may perform shuttering according to the global shutter method. When operating in the full mode, at least one of the first image sensor 2211 and the second image sensor 2221 may perform shuttering according to the rolling shutter method.

The working memory 2300 may be implemented as a volatile memory, such as DRAM and SRAM, or a non-volatile resistive memory, such as ferroelectric RAM (Fe-RAM), resistive RAM (RRAM), and phase-change RAM (PRAM). The working memory 2300 may store programs and/or data processed or executed by the AP 2100.

The storage 2400 may be implemented as a non-volatile memory device, such as NAND flash and RRAM. For example, the storage 2400 may be provided as a memory card (multimedia card (MMC), embedded MMC (eMMC), secure digital (SD) card, or micro SD, etc.). The storage 2400 may store image data provided from the camera module 2200.

The user interface 2500 may be implemented as various devices capable of receiving a user input, such as a keyboard, a curtain key panel, a touch panel, a fingerprint sensor, or a microphone. The user interface 2500 may receive the user input and provide, to the AP 2100, a signal corresponding to the received user input.

While aspects of the inventive concept have been particularly shown and described with reference to embodiments thereof, it will be understood that various changes in form and details may be made therein without departing from the spirit and scope of the following claims.

What is claimed is:

1. An image sensor comprising:
 a pixel array in which a plurality of pixels are arranged; and
 a row driver configured to transmit control signals to the pixel array,
 wherein the plurality of pixels each include
  a first photodiode,
  a first transfer transistor configured to transfer photocharges generated by the first photodiode to a floating diffusion node,
  a conversion gain control transistor connected to the floating diffusion node and configured to adjust a rate at which the photocharges are converted into a voltage of the floating diffusion node,
  a first source follower configured to amplify the voltage of the floating diffusion node and output the amplified voltage to a first node,
  a precharge selection transistor having one end connected to the first node and another end connected to a second node,
  a first capacitor configured to sample a reset voltage corresponding to a voltage level of the floating diffusion node that is reset,
  a first sampling transistor having one end connected to the second node and another end connected to the first capacitor,
  a second capacitor configured to sample a first image voltage corresponding to the voltage level of the floating diffusion node according to the photocharges generated by the first photodiode,
  a second sampling transistor having one end connected to the second node and another end connected to the second capacitor, a second source follower configured to amplify a voltage of the second node and output the amplified voltage, a first selection transistor connected between an output terminal of the second source follower and a column line, and a second selection transistor connected between the first node and the column line.

2. The image sensor of claim 1, wherein, the first selection transistor is configured to, when the pixel array operates in a first shutter mode, output an output voltage of the second source follower to the column line as a pixel signal, and the second selection transistor is configured to, when the pixel array operates in a second shutter mode, output a voltage of the first node to the column line as the pixel signal.

3. The image sensor of claim 2, wherein, when the pixel array operates in the first shutter mode, the second selection transistor is turned off, and when the pixel array operates in the second shutter mode, the precharge selection transistor, the first sampling transistor, the second sampling transistor, and the first selection transistor are turned off.

4. The image sensor of claim 2, wherein, when the pixel array operates in the first shutter mode, the reset voltage is sampled in the first capacitor during a first period in the plurality of pixels and the first image voltage is sampled in the second capacitor.

5. The image sensor of claim 4, wherein, the plurality of pixels are configured to, during a second period subsequent to the first period, sequentially output the reset voltage sampled in the first capacitor and the first image voltage sampled in the second capacitor to the column line as the pixel signal in units of rows.

6. The image sensor of claim 5, wherein the precharge selection transistor is turned on during the second period so that the second node is precharged based on the reset voltage, after the second node is precharged, the first sampling transistor is turned on so that the reset voltage sampled in the first capacitor is output to the column line as the pixel signal, after the reset voltage is output to the column line as the pixel signal, the precharge selection transistor is turned on so that the second node is precharged again based on the reset voltage, and after the second node is precharged again, the second sampling transistor is turned on so that the first image voltage sampled in the second capacitor is output to the column line as the pixel signal.

7. The image sensor of claim 5, wherein, the plurality of pixels are configured to, when the pixel array operates in the first shutter mode, sequentially output the pixel signal to the column line in units of rows, the plurality of pixels are configured to, after the plurality of pixels output the reset voltage output from the first source follower to the column line as the pixel signal, output the first image voltage to the column line as the pixel signal, and the second selection transistor is further configured to, during a second period subsequent to the first period, output the first image voltage of the floating diffusion node, which is output from the second source follower, to the column line as the pixel signal.

8. The image sensor of claim 2, wherein the plurality of pixels each further comprise:

a second photodiode;

a second transfer transistor configured to transfer photocharges generated by the second photodiode to the floating diffusion node;

a third capacitor configured to sample a second image voltage corresponding to a voltage level of the floating diffusion node corresponding to photocharges generated by the first photodiode and the second photodiode; and a third sampling transistor having one end connected to the second node and another end connected to the third capacitor.

9. The image sensor of claim 8, wherein, when the pixel array operates in the first shutter mode, the reset voltage is sampled in the first capacitor during a first period in the plurality of pixels, the first image voltage is sampled in the second capacitor, and the second image voltage is sampled in the third capacitor.

10. The image sensor of claim 9, wherein the plurality of pixels are configured to, during a second period subsequent to the first period, sequentially output the reset voltage sampled in the first capacitor, the first image voltage sampled in the second capacitor, and the second image voltage sampled in the third capacitor to the column line as the pixel signal in units of rows.

11. An image sensor comprising:

a pixel array in which a plurality of pixels are arranged; and a row driver configured to transmit control signals to the pixel array, wherein the plurality of pixels each include a plurality of sub-pixels each comprising a first photodiode and a second photodiode, a conversion gain control transistor connected to a floating diffusion node at which photocharges transferred from at least one of the plurality of sub-pixels are integrated, and configured to adjust a rate at which the photocharges are converted into a voltage of the floating diffusion node, a first source follower configured to amplify the voltage of the floating diffusion node and output the amplified voltage to a first node, a precharge selection transistor having one end connected to the first node and another end connected to a second node, a first sampling transistor having one end connected to the second node, a first capacitor having one end connected to another end of the first sampling transistor and another end to which a power supply voltage is applied, a second sampling transistor having one end connected to the second node, a second capacitor having one end connected to another end of the second sampling transistor and another end to which the power supply voltage is applied, a third sampling transistor having one end connected to the second node, a third capacitor having one end connected to another end of the third sampling transistor and another end to which the power supply voltage is applied, a second source follower configured to amplify a voltage of the second node and output the amplified voltage, a first selection transistor connected between an output terminal of the second source follower and a column line, and a second selection transistor connected between the first node and the column line.

12. The image sensor of claim 11, wherein, when the pixel array operates in a global shutter mode, the first selection transistor is turned on so that an output voltage of the second source follower is output to the column line as a pixel signal, and when the pixel array operates in a rolling shutter mode, the second selection transistor is turned on so that a voltage of the first node is output to the column line as the pixel signal.

13. The image sensor of claim 12, wherein the first capacitor is configured to, during a first period of a global dumping period, sample a reset voltage corresponding to a voltage level of the floating diffusion node that is reset, when the pixel array operates in the global shutter mode, the second capacitor is configured to, during a second period subsequent to the first period, sample a first image voltage corresponding to the voltage level of the floating diffusion node according to first photocharges generated by the first photodiode of each of the plurality of sub-pixels, and the third capacitor is configured to, during a third period subsequent to the second period, sample a second image voltage corresponding to the voltage level of the floating diffusion node according to second photocharges generated by the first photodiode and the second photodiode of each of the plurality of sub-pixels.

14. The image sensor of claim 12, wherein, when the pixel array operates in the rolling shutter mode, the plurality of sub-pixels are sequentially read out during a readout period of one row of the plurality of pixels.

15. The image sensor of claim 14, wherein, during a first period of a first sub-pixel readout period in which a first sub-pixel among the plurality of sub-pixels is read out, a reset voltage indicating a voltage level of the floating diffusion node that is reset is output to the column line through the second selection transistor, during a second period subsequent to the first period, a first image voltage indicating the voltage level of the floating diffusion node according to first photocharges generated by the first photodiode of the first sub-pixel is output to the column line through the second selection transistor, and during a third period subsequent to the second period, a second image voltage indicating the voltage level of the floating diffusion node according to second photocharges generated by the first photodiode and the second photodiode of the first sub-pixel is output to the column line through the second selection transistor.

16. The image sensor of claim 11, wherein the pixel array is formed on a first semiconductor substrate and a second semiconductor substrate, the plurality of sub-pixels, the first source follower, and the conversion gain control transistor are formed on the first semiconductor substrate, and the precharge selection transistor, the first capacitor, the first sampling transistor, the second capacitor, the second sampling transistor, the third capacitor, the third sampling transistor, the first selection transistor, and the second selection transistor are formed on a second semiconductor substrate.

17. An image processing device comprising:

an image sensor comprising a pixel array in which a plurality of pixels are arranged in a matrix form, the image sensor being configured to generate image data based on a light signal received by the pixel array; and an application processor configured to process the image data received from the image sensor and provide, to the image sensor, a mode setting signal for setting a first shutter mode or a second shutter mode, wherein the plurality of pixels each include a plurality of sub-pixels each comprising a first photodiode and a second photodiode, a conversion gain control transistor connected to a floating diffusion node at which photocharges transferred from at least one of the plurality of sub-pixels are integrated, and configured to adjust a rate at which the photocharges are converted into a voltage of the floating diffusion node, a first source follower configured to amplify the voltage of the floating diffusion node and output the amplified voltage to a first node, a precharge selection transistor having one end connected to the first node and another end connected to a second node, a first sampling transistor having one end connected to the second node, a first capacitor having one end connected to another end of the first sampling transistor and another end to which a power supply voltage is applied, a second sampling transistor having one end connected to the second node, a second capacitor having one end connected to another end of the second sampling transistor and another end to which the power supply voltage is applied, a third sampling transistor having one end connected to the second node, a third capacitor having one end connected to another end of the third sampling transistor and another end to which the power supply voltage is applied, a second source follower configured to amplify a voltage of the second node and output the amplified voltage, a first selection transistor connected between an output terminal of the second source follower and a column line, and a second selection transistor connected between the first node and the column line.

18. The image processing device of claim 17, wherein the pixel array of the image sensor is configured to selectively operate in a global shutter mode or a rolling shutter mode, based on the mode setting signal received from the application processor.

19. The image processing device of claim 18, wherein, when the pixel array operates in the global shutter mode, the first selection transistor is turned on so that an output of the second source follower is output to the column line as a pixel signal, and the second selection transistor is turned off.

20. The image processing device of claim 18, wherein, when the pixel array operates in the rolling shutter mode, the second selection transistor is turned on so that a voltage of the first node is output to the column line as a pixel signal, and the first selection transistor, the precharge selection transistor, the first sampling transistor, the second sampling transistor, and the third sampling transistor are turned off.

\* \* \* \* \*